(12) United States Patent
Huang et al.

(10) Patent No.: US 7,698,066 B2
(45) Date of Patent: Apr. 13, 2010

(54) METHOD AND APPARATUS FOR ESTIMATING FORMATION SLOWNESS

(75) Inventors: Xiaojun Huang, Houston, TX (US); Hezhu Yin, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 116 days.

(21) Appl. No.: 11/791,810

(22) PCT Filed: Dec. 22, 2005

(86) PCT No.: PCT/US2005/046827

§ 371 (c)(1),
(2), (4) Date: May 29, 2007

(87) PCT Pub. No.: WO2006/078416

PCT Pub. Date: Jul. 27, 2006

(65) Prior Publication Data

US 2008/0027650 A1 Jan. 31, 2008

Related U.S. Application Data

(60) Provisional application No. 60/644,318, filed on Jan. 14, 2005, provisional application No. 60/734,797, filed on Nov. 9, 2005.

(51) Int. Cl.
*G01V 1/00* (2006.01)
(52) U.S. Cl. ...................................................... 702/14
(58) Field of Classification Search .................... 702/14
See application file for complete search history.

(56) References Cited

U.S. PATENT DOCUMENTS 5,278,805 A   1/1994   Kimball et al. ............... 367/32
5,587,966 A   12/1996  Kimball et al. ............... 367/31
5,859,367 A   1/1999   Holbrook .................. 73/152.05
6,453,240 B1  9/2002   Blanch et al. .................. 702/11
6,654,688 B1  11/2003  Brie et al. ....................... 702/2
6,691,036 B2  2/2004   Blanch et al. .................. 702/11
2004/0001389 A1  1/2004   Tang ............................ 367/31
2005/0180261 A1* 8/2005   Mandal ........................ 367/31
2005/0261835 A1* 11/2005  Wang ............................. 702/6

FOREIGN PATENT DOCUMENTS

GB          2295014          5/1996

OTHER PUBLICATIONS

Ellefsen, K.J. et al. (1992) "Estimating a Shear Modulus of a Transversely Isotropic Formation," *Society of Exploration Geophysicists*, v.57(11), pp. 1428-1434, XP000325076.
Geerits, T. et. al. (2003) "Centroid Phase Slowness as a Tool for Dispersion Correction of Dipole Acoustic Logging Data," *Geophysics*, v.68(1), pp. 101-107, XP002336111.
Goldbery, D. et al. (2003) "Analysis of LWD Sonic Data in Low-Velocity Formations," *Soc. Explor. Geophys. Expanded Abstract*, 73rd Annual Mtg., Dallas, Texas, pp. 301-304.
Kimball, C.V. et al. (1984) "Semblance Processing of Borehole Acoustic Array Data," *Geophysics*, v.49, pp. 274-281.

(Continued)

*Primary Examiner*—Aditya Bhat

(57) ABSTRACT

A method and apparatus for estimating the slowness of a geological formation using waveforms recorded by an acoustic borehole logging tool. Phase slowness coherence is extracted from the recorded waveforms after transformation to the frequency domain (804) at various frequencies (806), and this is converted into a formation slowness curve (808) which can be used as an objective function from which an anomaly, such as a local maximum or minimum (810), can be identified as representative of an estimate of the formation slowness.

51 Claims, 29 Drawing Sheets

OTHER PUBLICATIONS

Kimball, C.V. (1998) "Shear Slowness Measurement by Dispersive Processing of Borehole Flexural Mode," *Geophysics*, v.63, pp. 337-344.

Huang, et al. "A Data-Driven Approach to Extract Shear and Compressional Slowness From Dispersive Waveform Data, Presentation".

Kozak, M.Z. et al (2001) "Estimation of Formation Shear Slowness Using Phase Velocity and Semblance Method—Comparative Studies," *Soc. Explor. Geophys. Expanded Abstracts*, 71st Annual Mtg., pp. 1902-1905.

Lang et al. (1987) "Estimating Slowness Dispersion From Arrays of Sonic Logging Waveforms," *Geophysics*, vol. 52, No. 4 (Apr. 1987), pp. 530-544.

Nolte el al. (1997) "Dispersion Analysis of Split Flexural Waves," Borehole Acoustics and Logging Reservoir Delineation Consortia Annual Report, *MIT*, 27 pages.

Taner, M. et al. (1979) "Complex Seismic Trace Analysis," *Geophysics*, v.44, pp. 1043-1063.

Tang, X.M. et al. (1995) "A Dispersive-Wave Processing Technique for Estimating Formation Shear Velocity from Dipole and Stoneley Waveforms," *Soc. Of Exp. Geophysicists*, v.60(1), pp. 19-28 XP000507553.

Velero, H.P. et al. (2004) "Processing of Monopole Compressional in Slow Formation," *Soc. Explor. Geophys. Expanded Abstracts*, 74th Annual Mtg., Denver, CO., pp. 318-321.

\* cited by examiner

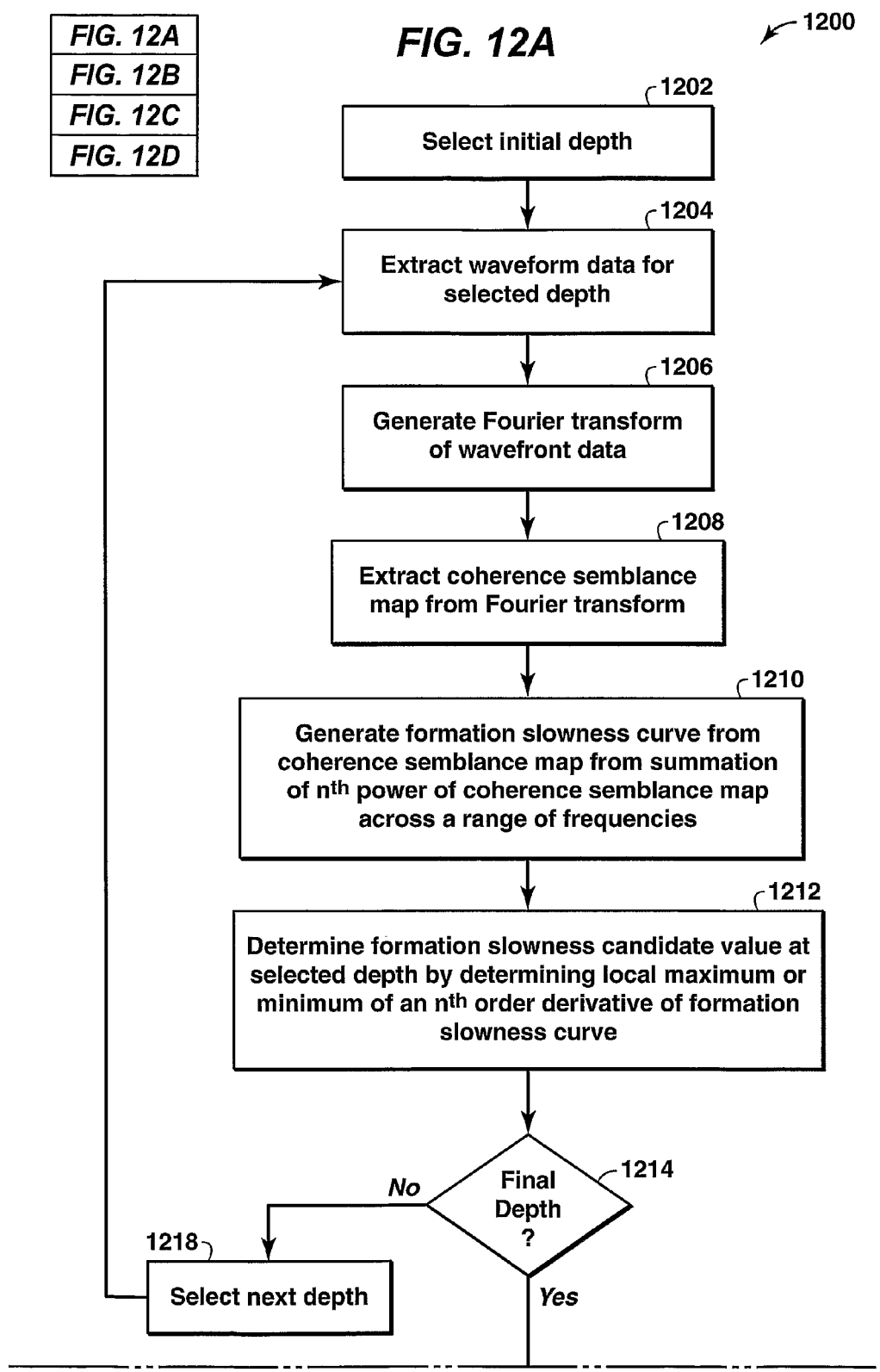

METHOD AND APPARATUS FOR ESTIMATING FORMATION SLOWNESS

CROSS-REFERENCE TO RELATED APPLICATIONS

This application is the National Stage of International Application No. PCT/US2005/046827, filed 22 Dec. 2005, which claims the benefit of both U.S. Provisional Patent Application Nos. 60/644,318 filed 14 Jan. 2005 and 60/734,797 filed 9 Nov. 2005.

BACKGROUND OF THE INVENTION

This invention relates generally to acoustic well logging, and in particular to estimating formation slowness using an acoustic well logging tool.

Formation compressional and shear slowness are two of the most important parameters used in the exploration and production of hydrocarbon. Conventionally, they are measured by sonic logging. A sonic logging tool consists of two primary parts: data acquisition and data processing. Data acquisition is done by sending a logging tool down into an exploration or production well, and the acoustic source on the logging tool sends an acoustic signal that subsequently propagates along the well and is recorded at several evenly spaced receivers that are some distance away from the source. Formation compressional and shear slowness are then estimated by processing the recorded waveforms, using array sonic processing techniques, such as the slowness-time coherence method (STC).

Recent studies have shown that STC yields an accurate slowness estimation when, and only when, the acoustic waves propagated along a wellbore are non-dispersive, or multiple arrivals contained in the waveforms are well separated in the slowness-time domain. When the underlying waveforms are dispersive or the waveforms compose of mixed modes with similar group velocities, such as in the case of wireline leaky P-mode (for compressional slowness in very slow formation), wireline dipole mode (for shear slowness), quadrupole mode (for shear slowness) in logging while drilling (LWD) or some monopole mode (for compressional slowness) in LWD, STC produces a systematic error in the slowness estimation. The amount of those systematic errors is large enough to result in negative implications in the exploration and production of hydrocarbons, such as oil can be mistaken as water in prospect assessment. Furthermore, the correlogram produced by STC method, currently used as a quality control tool for slowness estimation by industry, does not reflect the accuracy of the slowness estimation.

Recently, several approaches have been developed to address the limitations of the existing methods and apparatus for estimating formation slowness. Theses fall into two categories: model-driven dispersion correction and phase velocity processing. The model-driven dispersion correction approaches have been adapted by major logging companies, such as Schlumberger and Baker Hughes. They have been developed to address wireline dipole mode and leaky P mode. Baker Hughes also applies its approach to their quadrupole LWD data. The model-driven approach still makes use of STC and corrects dispersion effects by applying a theoretically calculated dispersion curve of the corresponding mode. The dispersion correction of the model-driven approach is only accurate under several assumptions that are hard to meet in reality, including circular borehole, homogeneous and isotropic formation and good knowledge of a variety of formation and mud properties, including slowness and density. In the case where the waveforms contain multiple arrivals that are not well separated in slowness-time domain, all model-driven methods will not arrive at the correct formation slowness. The phase velocity processing approach estimate instantaneous phase slowness for each receiver pairs, which could potential yield more accurate slowness estimation than STC method. However as the formation slowness value is computed by averaging over the desired travel time interval, the phase velocity processing still generates a systematic error in slowness estimation. Also the phase velocity processing may suffer some stability problems.

The present invention is directed to overcoming one or more of the limitations of the existing methods and apparatus for estimating formation slowness.

SUMMARY OF THE INVENTION

According to one aspect of the present invention, a method for estimating formation slowness using waveforms recorded by an acoustic logging tool is provided that includes extracting a phase slowness coherence of the recorded waveforms at a plurality of frequencies within a range of frequencies and phase slownesses; converting the extracted phase slowness coherence into a formation slowness curve whose magnitude is a function of the extracted phase slowness coherence; and determining one or more anomalies within the formation slowness curve; wherein the location of one of the anomalies of the formation slowness curve is representative of the estimated formation slowness.

According to another aspect of the present invention, a method for determining a quality of a determination of an estimate of a formation slowness using waveforms recorded by an acoustic logging tool positioned within a wellbore that traverses a subterranean formation, is provided that includes extracting a phase slowness coherence of the recorded waveforms at a plurality of frequencies within a range of frequencies and phase slownesses; converting the extracted phase slowness coherence into a formation slowness curve whose magnitude is a function of the extracted phase slowness coherence; determining one or more anomalies within the formation slowness curve, wherein the location of one of the anomalies of the formation slowness curve is representative of the estimated formation slowness; positioning the logging tool at a plurality of depths within the borehole; repeating extracting, converting, and determining at each depth; generating a mapping of the formation slowness curve over a range of the depths; and generating values for the estimated formation slowness at the range of depths and constructing a formation estimate curve; wherein the quality of the estimated formation slownesses determined is a function of a degree to which the formation estimate curve overlays an edge of the mapping of the formation slowness curve.

According to another aspect of the present invention, a system for estimating formation slowness using waveforms recorded by an acoustic logging tool has been provided that includes means for extracting a phase slowness coherence of the recorded waveforms at a plurality of frequencies within a range of frequencies and phase slownesses; means for converting the extracted phase slowness coherence into a formation slowness curve whose magnitude is a function of the extracted phase slowness coherence; and means for determining one or more anomalies within the formation slowness curve; wherein the location of one of the anomalies of the formation slowness curve is representative of the estimated formation slowness.

According to another aspect of the present invention, a system for determining a quality of a determination of an estimate of a formation slowness using waveforms recorded by an acoustic logging tool positioned within a wellbore that traverses a subterranean formation has been provided that includes means for extracting a phase slowness coherence of the recorded waveforms at a plurality of frequencies within a range of frequencies and phase slownesses; means for converting the extracted phase slowness coherence into a formation slowness curve whose magnitude is a function of the extracted phase slowness coherence; means for determining one or more anomalies within the formation slowness curve, wherein the location of one of the anomalies of the formation slowness curve is representative of the estimated formation slowness; positioning the logging tool at a plurality of depths within the borehole; repeating extracting, converting, and determining at each depth; generating a mapping of the formation slowness curve over a range of the depths; and means for generating values for the estimated formation slowness at the range of depths and constructing a formation estimate curve; wherein the quality of the estimated formation slownesses determined is a function of a degree to which the formation estimate curve overlays an edge of the mapping of the formation slowness curve.

BRIEF DESCRIPTION OF THE DRAWINGS

FIGS. 12A, 12B, 12C and 12D are flow chart illustrations of an exemplary embodiment of a method for operating the system of FIG. 1.

DETAILED DESCRIPTION OF THE ILLUSTRATIVE EMBODIMENTS

Figure 1:
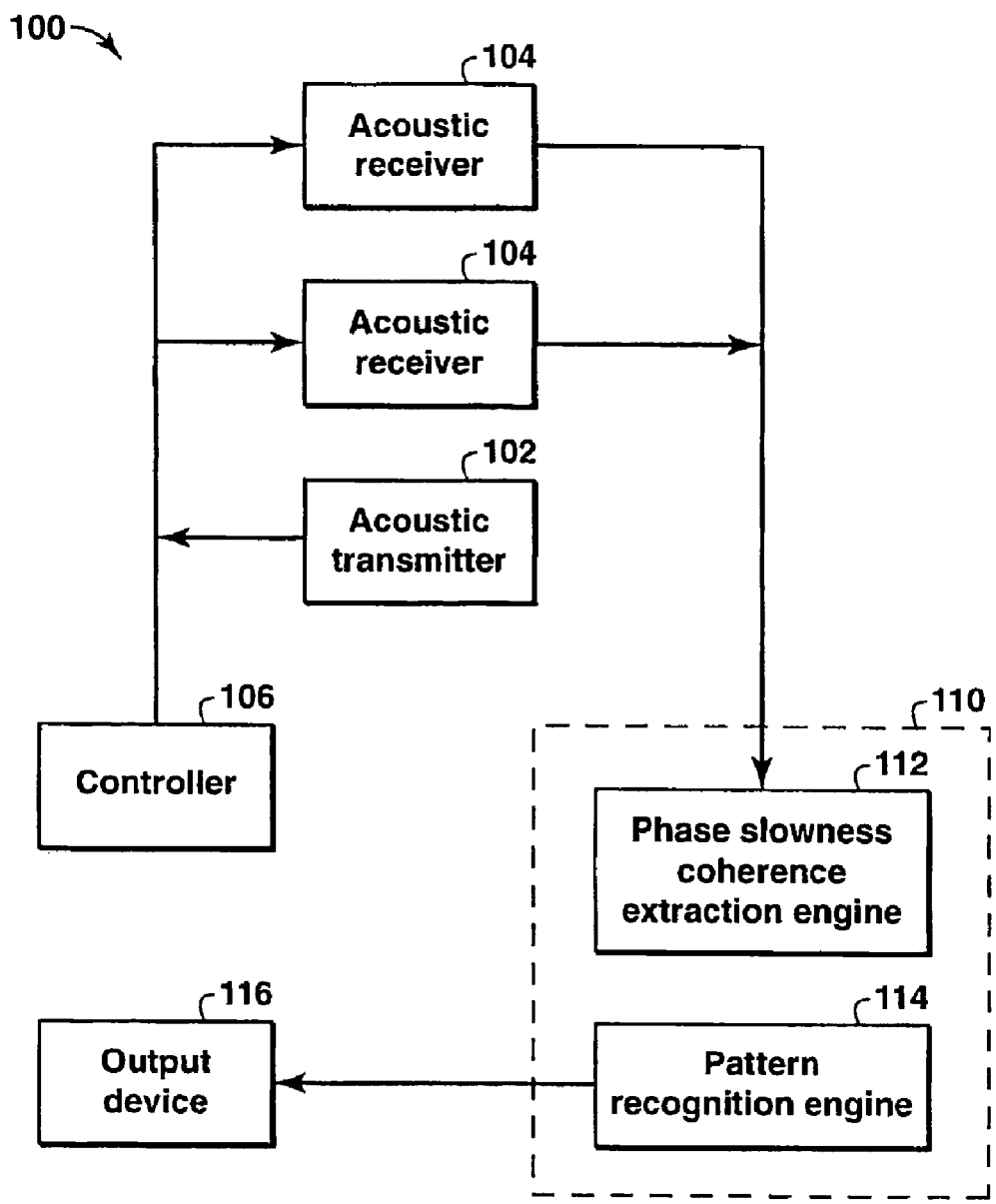
FIG. 1 is a schematic illustration of an exemplary embodiment of a system for estimating formation slowness.

Referring initially to FIG. 1, a system 100 for estimating formation slowness includes a conventional acoustic transmitter 102 and a plurality of conventional acoustic receivers 104. The acoustic transmitter 102 and the acoustic receivers 104 are operably coupled to a conventional controller 106. The acoustic receivers 104 are also operably coupled to a signal processing engine 110 that includes a phase slowness coherence extraction engine 112 and a pattern recognition engine 114. A conventional output device 116 is coupled to the signal processing engine 110 and the controller 106. The design and general operation of the acoustic transmitter 102, acoustic receivers 104, controller 106, and output device 116 are considered well known to persons having ordinary skill in the art.

Figure 2:
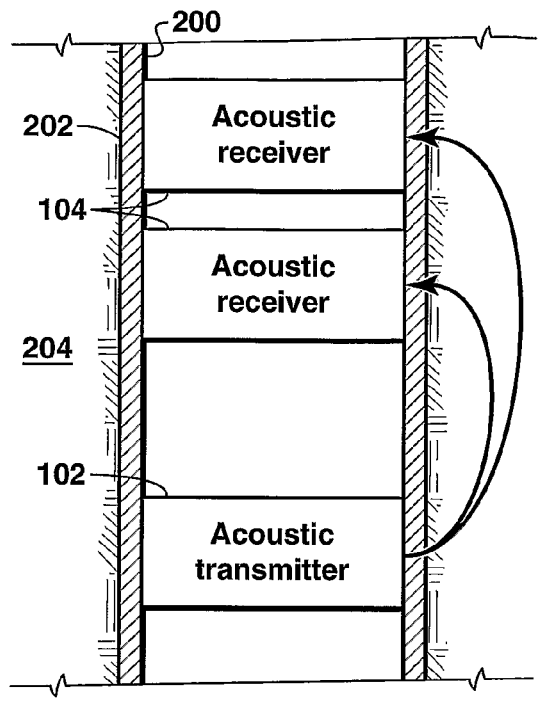
FIG. 2 is a fragmentary cross sectional illustration of the system of FIG. 1 during the operation of the system.
Figure 3:
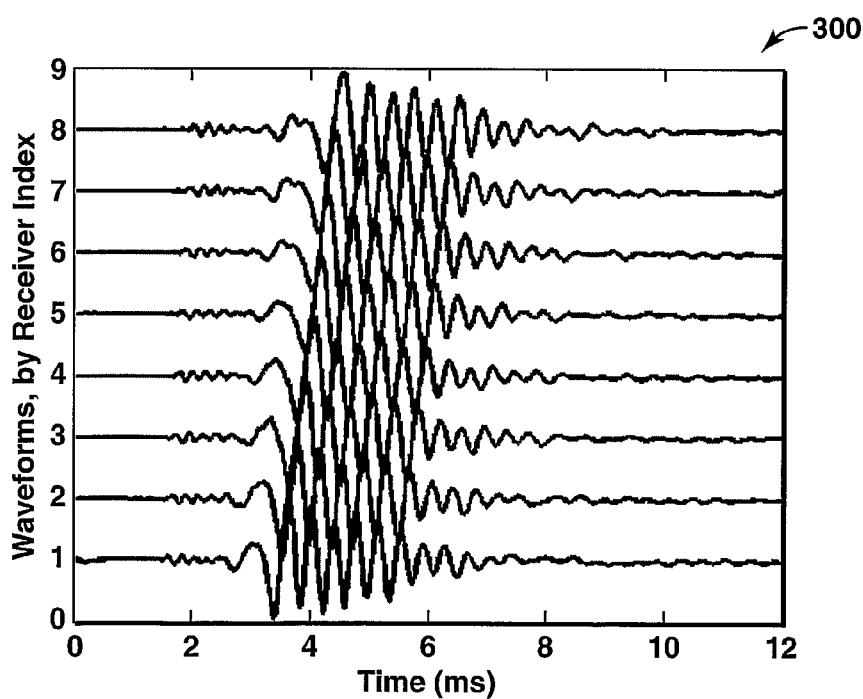
FIG. 3 is a graphical illustration of typical waveforms detected during the operation of the system of FIG. 1.

During operation of the system 100, as illustrated in FIG. 2, the acoustic transmitter 102 and the acoustic receivers 104 may be positioned within a logging sonde 200 and supported within a wellbore 202 that traverses a subterranean formation 204. In an exemplary embodiment, the acoustic transmitter 102 and the acoustic receivers 104 are centrally positioned within the wellbore 202, and the wellbore 202 may, or may not, include a cased section. The acoustic transmitter 102 may then be operated in a conventional manner to generate and transmit acoustic signals into and through the formation 204 that may then be detected and processed by the acoustic receivers 104 to thereby generate a series of waveforms 300 as illustrated in FIG. 3.

Figure 4:
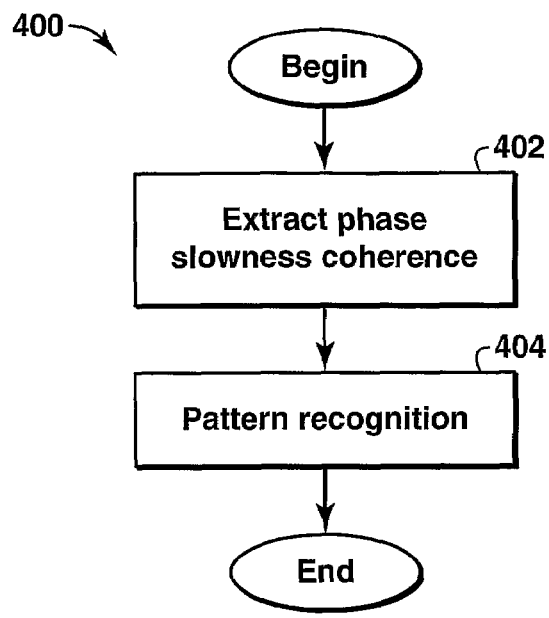
FIG. 4 is a flow chart illustration of an exemplary embodiment of a method for operating the system of FIG. 1.
Figure 5:
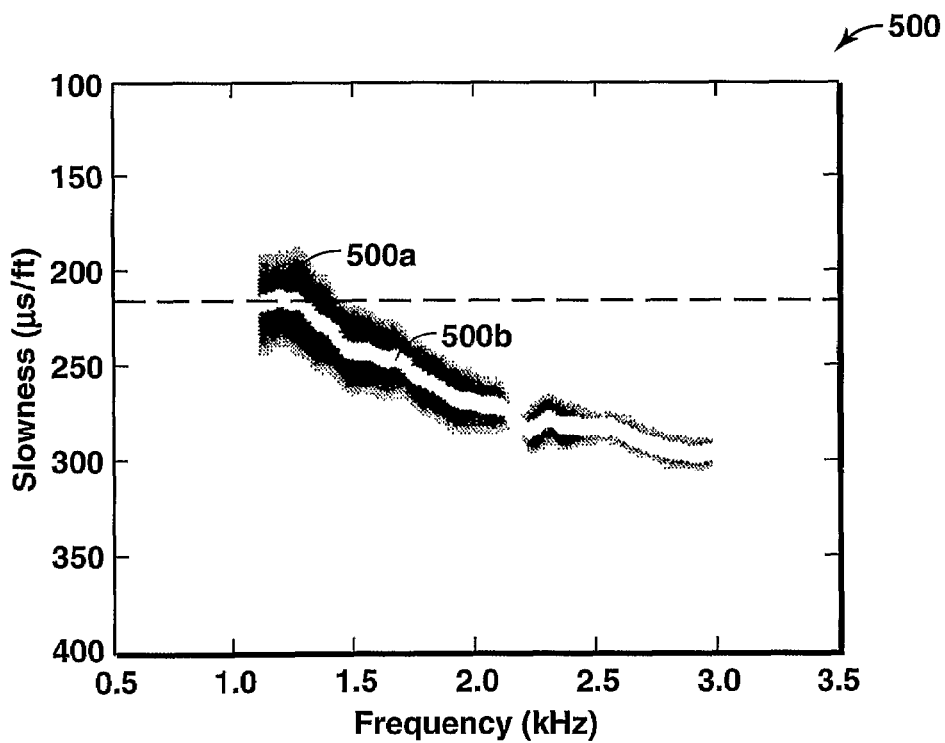
FIG. 5 is a graphical illustration of an exemplary embodiment of a phase slowness coherence generated during the implementation of the method of FIG. 4 by the system of FIG. 1.

In an exemplary embodiment, as illustrated in FIG. 4, during operation of the system 100, the system implements a method 400 of estimating formation slowness for the formation in which the waveforms 300 are processed by the phase slowness coherence extraction engine 112 to generate the phase slowness coherence 500 at each frequency over predetermined frequency and slowness intervals in step 402 as illustrated in FIG. 5. In an exemplary embodiment, as illustrated in FIG. 5, the phase slowness coherence 500 includes a coherence semblance map 500a and a dispersion curve 500b, both of which are generated from the waveforms 300.

In an exemplary embodiment, in step 402, the frequency and slowness intervals are selected to cover the desired borehole mode, such as, for example, leaky P, dipole, quadrupole, S or P mode. In an exemplary embodiment, in step 402, the phase slowness coherence extraction may be provided as disclosed in one or more of the following: 1) Lang et al., Estimating Slowness Dispersion From Arrays of Sonic Logging Waveforms, *Geophysics*, Vol. 52, No. 4 (April 1987), p. 530-544; 2) U.S. Pat. No. 6,691,036; and/or 3) Nolte et al., 1997, Dispersion analysis of split flexural waves, *Borehole Acoustics and Logging/Reservoir Delineation Consortia Annual Report*, MIT.

Figure 6:
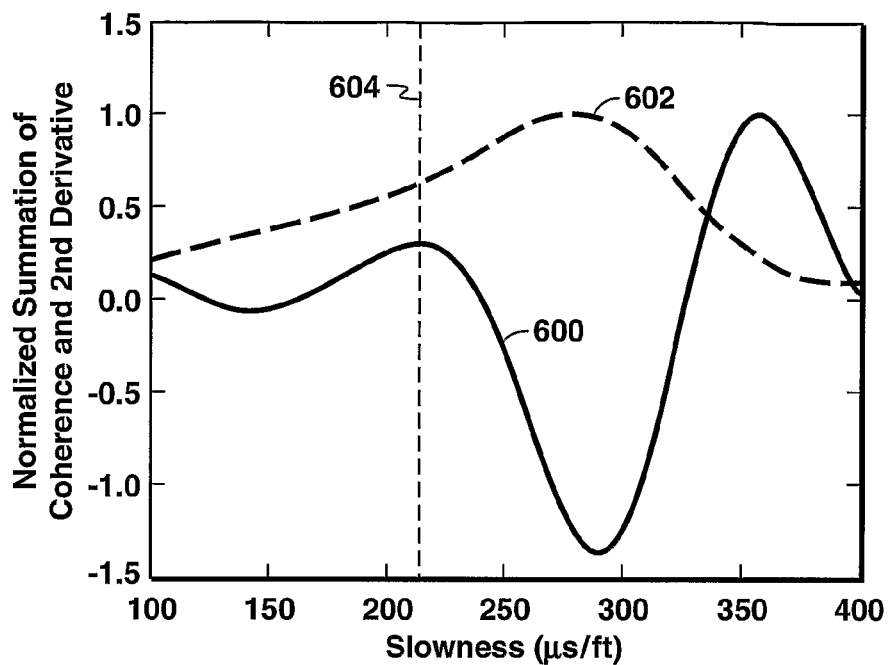
FIG. 6 is a graphical illustration of an exemplary embodiment of a curve containing information representative of the formation slowness generated during the implementation of the method of FIG. 4 by the system of FIG. 1.

In an exemplary embodiment, in step 404, the phase slowness coherence at each frequency over a predetermined frequency interval determined in step 402 is then processed by the pattern recognition engine 114 to generate the estimate of the value of the formation slowness. In an exemplary embodiment, in step 404, the phase slowness coherence generated in step 402 is converted into a formation slowness curve 600 with the magnitude of the formation slowness curve being a function of slowness as illustrated in FIG. 6. Furthermore, in an exemplary embodiment, the formation slowness is associated with an anomaly of the formation slowness curve 600. In an exemplary embodiment, the anomaly associated with the formation slowness value is a local maximum or minimum of the formation slowness curve 600, and the slowness value for the local minimum or maximum is representative of the formation slowness. In an exemplary embodiment, the formation slowness may then be obtained, for example, by using a conventional optimization method to determine the local maximum or minimum of the curve 600.

In an exemplary embodiment, in step 404, as illustrated in FIG. 6, the magnitude of the formation slowness curve 600 is a function of the $2^{nd}$ order derivative of a different formation slowness curve 602 whose magnitude is a function of a summation across frequencies of the phase slowness coherence 500.

Figure 7:
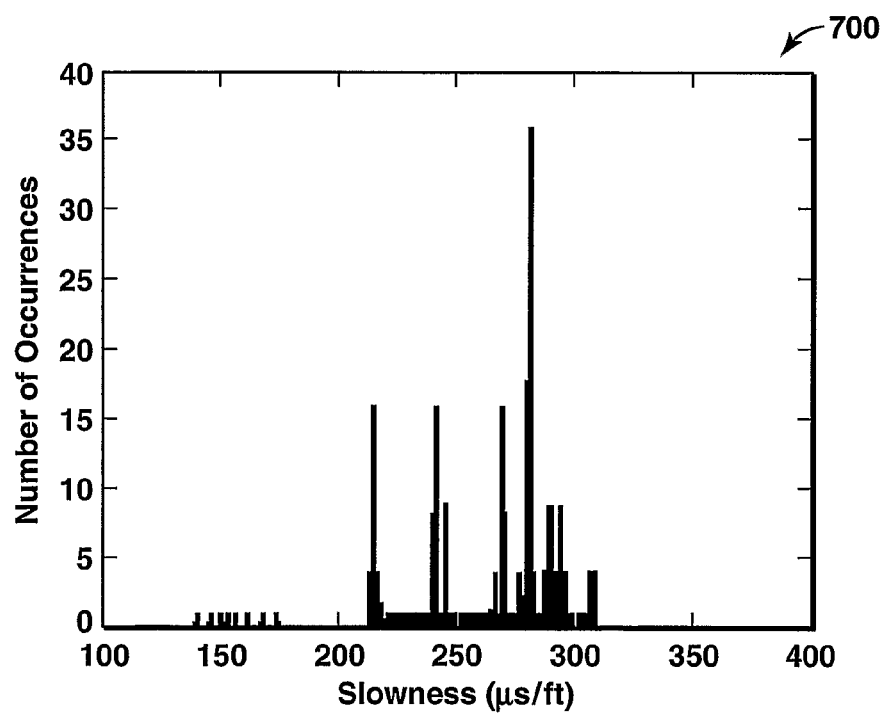
FIG. 7 is a graphical illustration of an exemplary embodiment of a histogram containing information representative of the formation slowness generated during the implementation of the method of FIG. 4 by the system of FIG. 1.

In an exemplary embodiment, in step 404, the magnitude of the curve 600 may be: 1) a summation across frequencies of the $n^{th}$ power of the phase slowness coherence 500; 2) a summation across frequencies of the $n^{th}$ order derivatives of the phase slowness coherence; 3) $n^{th}$ order derivatives of a summation across frequencies of the $n^{th}$ power of the phase slowness coherence; 4) the probability density function of the phase slowness population in the dispersion curve 500b; 5) a summation across frequencies of the $n^{th}$ power of the coherence semblance map 500a; 6) $n^{th}$ order derivatives of a summation across frequencies of the $n^{th}$ power of the coherence semblance map; and/or 7) a histogram 700 of the phase slowness population in the dispersion curve 500b as illustrated in FIG. 7. A threshold may be used to zero-out small semblance points in advance. Depending on the data quality and characteristics, the person skilled in the art will be able to identify other choices for a formation slowness curve that are suitable for the present invention, such as a histogram or probability density function of the dispersion curve modified by the characteristics of the data. Examples of the characteristics of the data include but are not limited to wave spectra, the values of the coherence semblance map at each respective slowness-frequency point, or the $n^{th}$ power of the values of the coherence semblance map at each respective slowness-frequency point. For instance, suppose at a given frequency, values of the slowness-frequency points on the coherence semblance map are denoted as $\rho=[\rho_1 \rho_2 \ldots \rho_n]$ and each component of $\rho$, $\rho_i$ (i=1, 2, . . . n), is associated to a slowness value. The slowness value, DT, associated with the maximum component of $\rho$ (denoted as $\rho_m$, is taken as the slowness of the wave at the frequency. When computing the histogram, the number of slowness values at that frequency is counted as $(n\rho_m,)^l$ instead of 1, where $\underline{\rho_m}$ is an integer number closest to $\rho_m$. (In the preceding, l and n are real numbers greater than zero.) It should be understood that the term used herein, "formation slowness curve", can also be called an "objective function", a term that will be familiar to those who work in the field. The objective function must be some quantity that is a function of slowness, i.e., the formation slowness curve must be such a quantity plotted vs. slowness. The present invention and the appended claims are not limited to the specific examples given herein for the formation slowness curve.

In an exemplary experimental implementation of the method 400, as illustrated in FIG. 5, the phase slowness coherence 500 provided a frequency domain coherence semblance map and, as illustrated in FIG. 6, the magnitude of the formation slowness curve 600 was equal to the $2^{nd}$ derivative of the summation across frequencies of the coherence semblance map 500a. A local maximum 604 of the formation slowness curve 600 yielded a corresponding formation slowness of 215 μs/ft.

In an exemplary embodiment, the method 400 can be implemented by the system 100 to generate an acoustic log by repeating the method at each logging depth. The curve 600, generated from phase slowness coherence 500, may then be plotted as a color-coded map in the depth and slowness domains.

In an exemplary embodiment, the acoustic transmitter 102 and the acoustic receivers 104 are provided as part of a conventional acoustic downhole logging tool in which the frequency band and signal-to-noise ratio of the waveforms 300 are selected to be appropriate for the operating environment of the selected borehole 202 and formation 204 in a conventional manner.

In an exemplary embodiment, during operation of the system 100, several representative samples of waveforms 300 are generated and analyzed to determine an optimal set of parameters for further operation of the system 100, when implementing the method 400, such as, for example, the frequency and slowness range. Furthermore, in an exemplary embodiment, during operation of the system 100, the most suitable quantity and anomaly that can single out the formation slowness from the curve 600 is also characterized from any number of sample runs of the system.

In an exemplary embodiment, in step 404, the preferred quantity and anomaly in the curve 600 varies as a function of the characteristics of a mode and waveform data. In particular, to estimate formation shear slowness from wireline dipole mode or LWD quadrupole mode, or estimate formation compressional slowness from wireline leaky P mode, the preferred quantity in the curve is the summation across all frequencies of the $n^{th}$ power of the coherence semblance map 500a generated in step 402. The formation slowness value may then be determined by searching for one of the local maxima of the first order derivative of the quantity with respect to slowness.

Alternatively, if the wireline dipole data or leaky P data contains significant energy around the cutoff frequency, it is more desirable to obtain, in step 404, the histogram, the modified histogram, the probability density function, or the modified probability density function of the phase slowness distribution of the dispersion curve 500b generated in step 402, and then select the formation slowness at a local maximum of the probability density function or of the histogram.

Alternatively, in the case of monopole logging while drilling (LWD), where the energy of the formation compressional arrival can only surpass drilling collar arrivals in a frequency stop band, the preferred methodology for step 404 depends upon the slowness difference between the drilling collar arrival and formation compressional arrival. When the slowness of formation compressional arrival differs from drilling collar arrival such that the summation of the $n^{th}$ power of the coherence semblance map 500a has two local maxima, with one of them corresponding to the formation compressional arrival, the preferred quantity in step 404 can be either the summation of the $n^{th}$ power of the coherence semblance map 500a or the probability density function or histogram. The anomaly that is then used to determine formation compressional slowness is the local maximum of the quantity. When otherwise the slowness of formation compressional arrival and drilling collar arrival is similar, the preferred quantity in step 404 is the first order derivative of the summation of the $n^{th}$ power of the coherence semblance map 500a. The anomaly that is then used to determine formation compressional slowness is the local maximum/minimum of the quantity. When the formation compressional arrival is slower than the drilling collar arrival, the anomaly is a local minimum, otherwise it is a local maximum.

In several exemplary experimental implementations of the method 400 using the system 100, the waveforms 300, the phase slowness coherence 500, and/or the curve 600 were further processed using conventional data smoothing methods.

In an exemplary embodiment, operation of the system 100 using the method 400 provides a method for estimating formation compressional and shear slowness by a combination of frequency-domain-semblance (FDS) analysis and automatic pattern recognition (APR) on the waveforms 300. In an exemplary embodiment, the method 400 is: 1) data-driven; 2) is not affected by mode dispersion, borehole shape, formation heterogeneity/anisotropy, and/or 3) is not affected by other formation and mud properties. In an exemplary embodiment, the method 400 extracts the formation slowness from dispersive waveforms or waveforms containing multiple modes that cannot be well separated in the slowness-time domain. Furthermore, in an exemplary embodiment, the method 400 is able to provide a correct formation slowness value when a method using slowness time coherence (STC) produces a correct formation slowness. In an exemplary embodiment, the method 400 does not average slowness across frequency or time interval as would be done in a STC method or phase velocity processing based methods. In an exemplary embodiment, the method 400 provides a better quality control map than the conventionally used STC-based correlagram, which does not reveal the accuracy of the slowness estimation if the waveforms 300 are dispersive or if the waveforms are composed of mixed modes that are not well separated in the slowness-time domain.

Figure 8A:
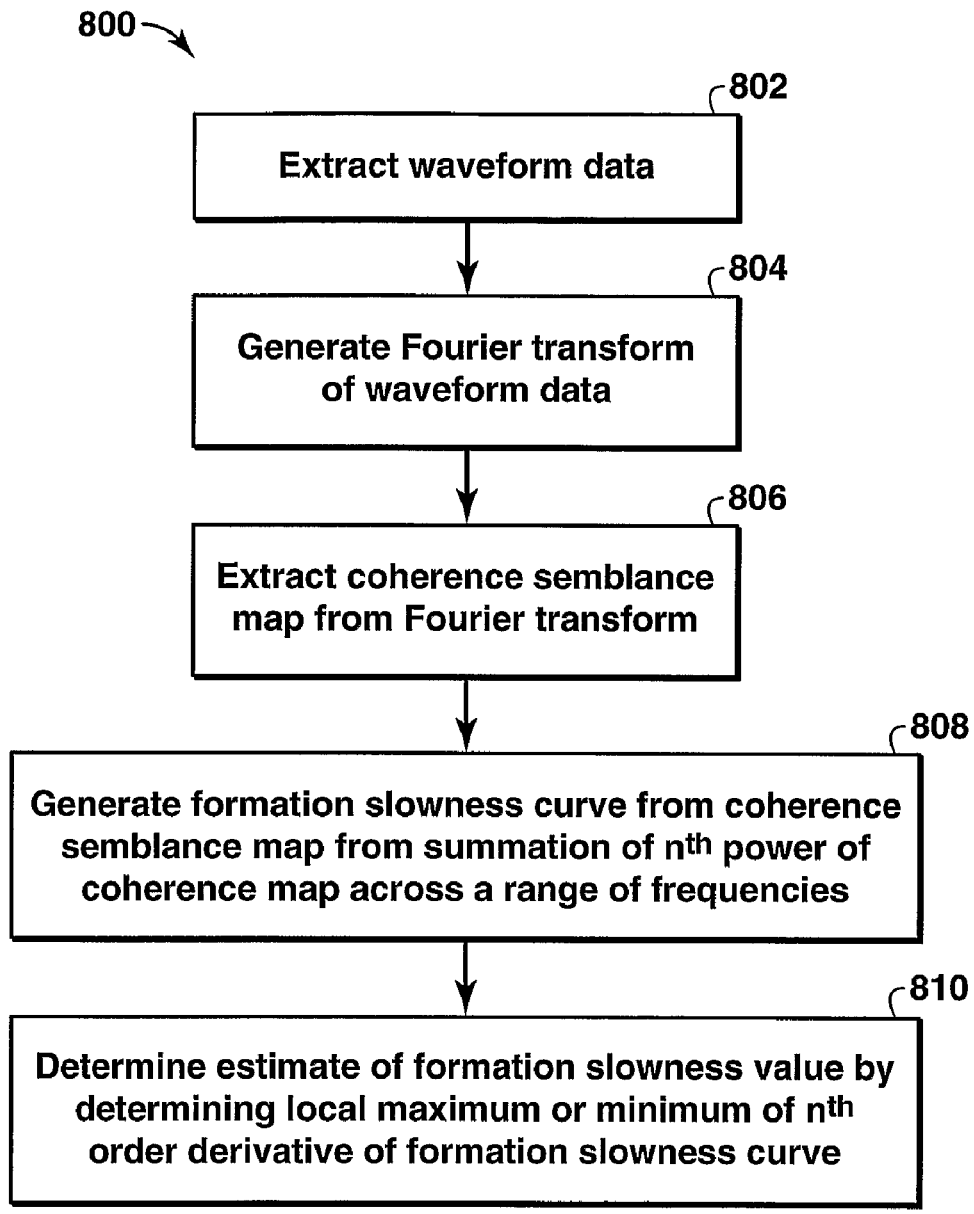
FIG. 8A is a flow chart illustration of an exemplary embodiment of a method for operating the system of FIG. 1.
Figure 8B:
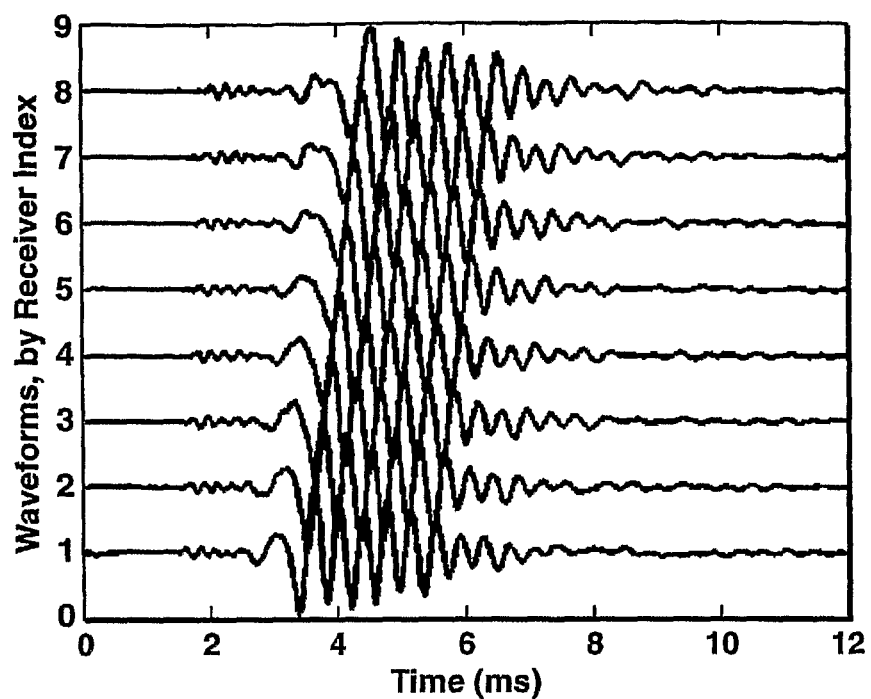
FIG. 8B is a graphical illustration of an exemplary embodiment of typical waveforms detected during the operation of the method of FIG. 8A.

Referring to FIG. 8A, in an exemplary embodiment, the system 100 implements a method 800 for estimating a value for the formation slowness in which, in step 802, waveform data $w_i(t)$, for i=1 to N, where N=number of acoustic receivers 104, as illustrated in FIG. 8B, are extracted by operating the acoustic transmitter 102 and acoustic receivers 104 in a conventional manner. A Fourier transform $W_i(f)$, for i=1 to N, of the extracted acoustic data is then generated in step 804. In an exemplary embodiment, in step 804, the length $N_{fft}$ of the Fourier transform $W_i(f)$ is selected to be at least four times longer than the time domain signal $w_i(t)$.

Figure 8C:
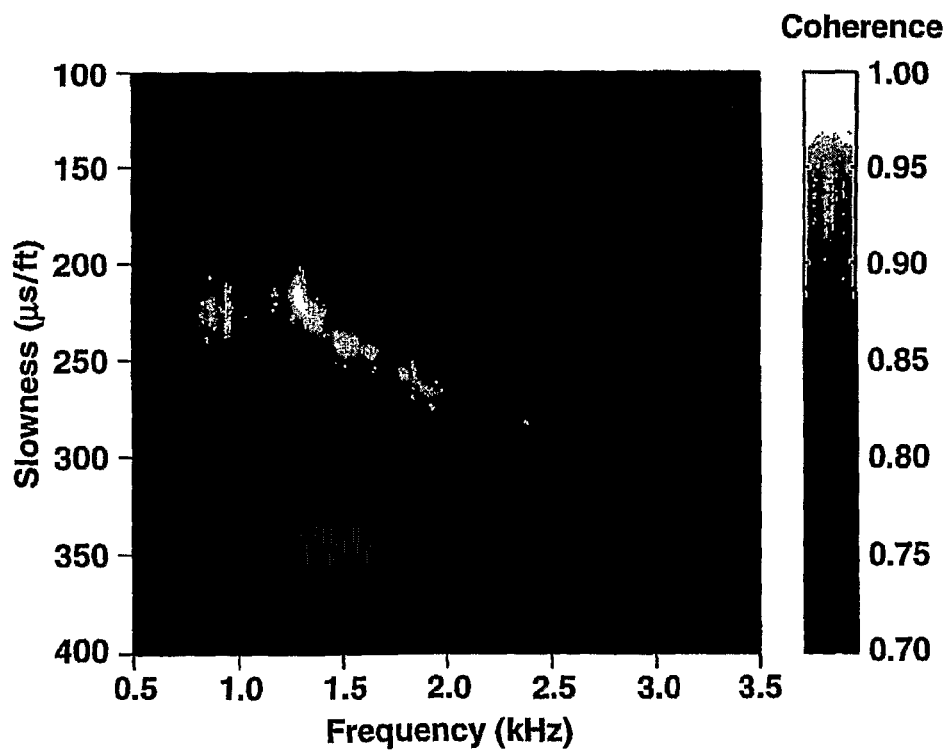
FIG. 8C is a graphical illustration of an exemplary embodiment of a coherence semblance map extracted during the operation of the method of FIG. 8A.

A coherence semblance map P(DT, f), where DT=slowness, as illustrated in FIG. 8C, is then generated from the Fourier transform $W_i(f)$ in step 806. In an exemplary embodiment, the coherence semblance map P(DT, f) is generated from the Fourier transform $W_i(f)$ in step 806 using the methodology as disclosed in Nolte et al., 1997, Dispersion analysis of split flexural waves, *Borehole Acoustics and Logging/Reservoir Delineation Consortia Annual Report*, MIT. During or after generation of the coherence semblance map, an option is to apply a threshold to zero out small semblance points. The coherence semblance map can optionally also be smoothed to reduce noise, using known noise-reduction techniques.

Figure 8D:
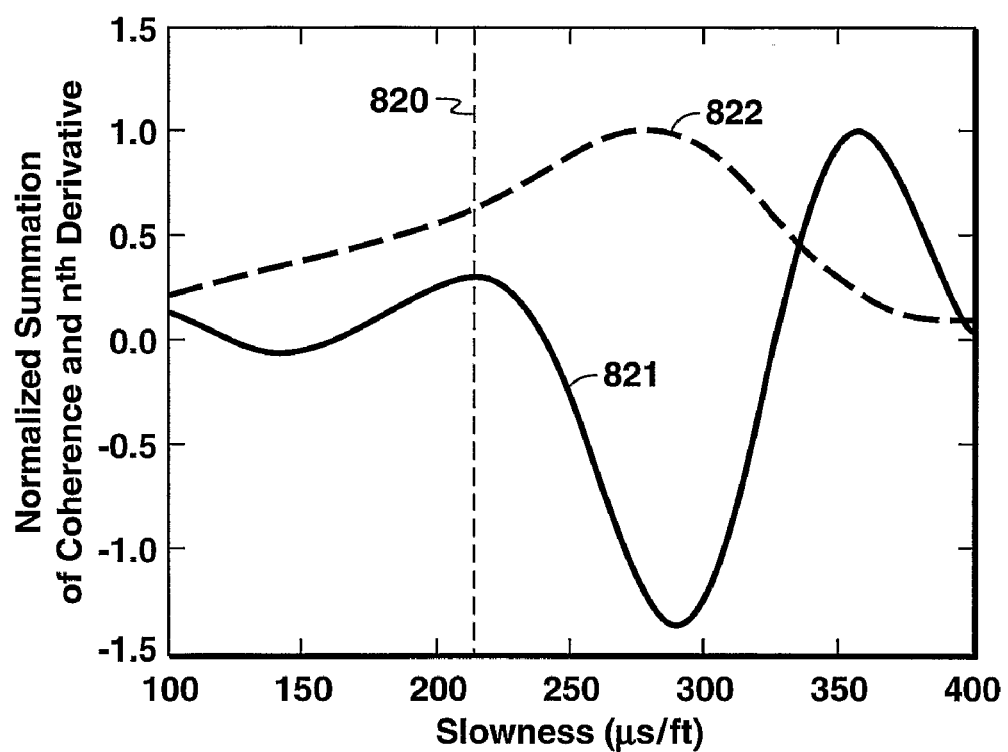
FIG. 8D is an exemplary embodiment of a formation slowness curve extracted during the operation of the method of FIG. 8A.

A formation slowness curve E(DT), as illustrated in FIG. 8D, is then generated from the coherence semblance map P(DT, f) in step 808 in accordance with the following equation:

$$E(DT) = \int_{f_{min}}^{f_{max}} P(DT, f)^n df$$

In an exemplary embodiment, the formation slowness curve E(DT) is generated in step 808 by a summation of the coherence semblance map P(DT, f) within a range of frequencies and slownesses.

As illustrated in FIG. 8D, an estimate 820 of the value of the formation slowness DTE is then determined in step 810 by determining the local maximum or minimum of an nth order derivative 821 of the slowness curve E(DT), 822 in FIG. 8D, in accordance with one of the following equations:

$$DTE = \underset{DT}{MAX} \frac{\partial^n (E)}{\partial DT^n}$$

$$DTE = \underset{DT}{MIN} \frac{\partial^n (E)}{\partial DT^n}$$

In an exemplary embodiment, in steps 808 and 810, the optimal value for n may vary as a function of the operating conditions. As a result, in an exemplary embodiment, the optimal value for n, in steps 808 and 810, may be determined using an empirical analysis.

In several exemplary embodiments, the operational steps of the method 800 may be performed by one or more elements of the system 100. In an exemplary embodiment, the method 800 is implemented by the system 100 when the system operates in one of the following modes of operation: 1) wireline leaky-P (DTC); or 2) dipole (DTS).

Figure 9A:
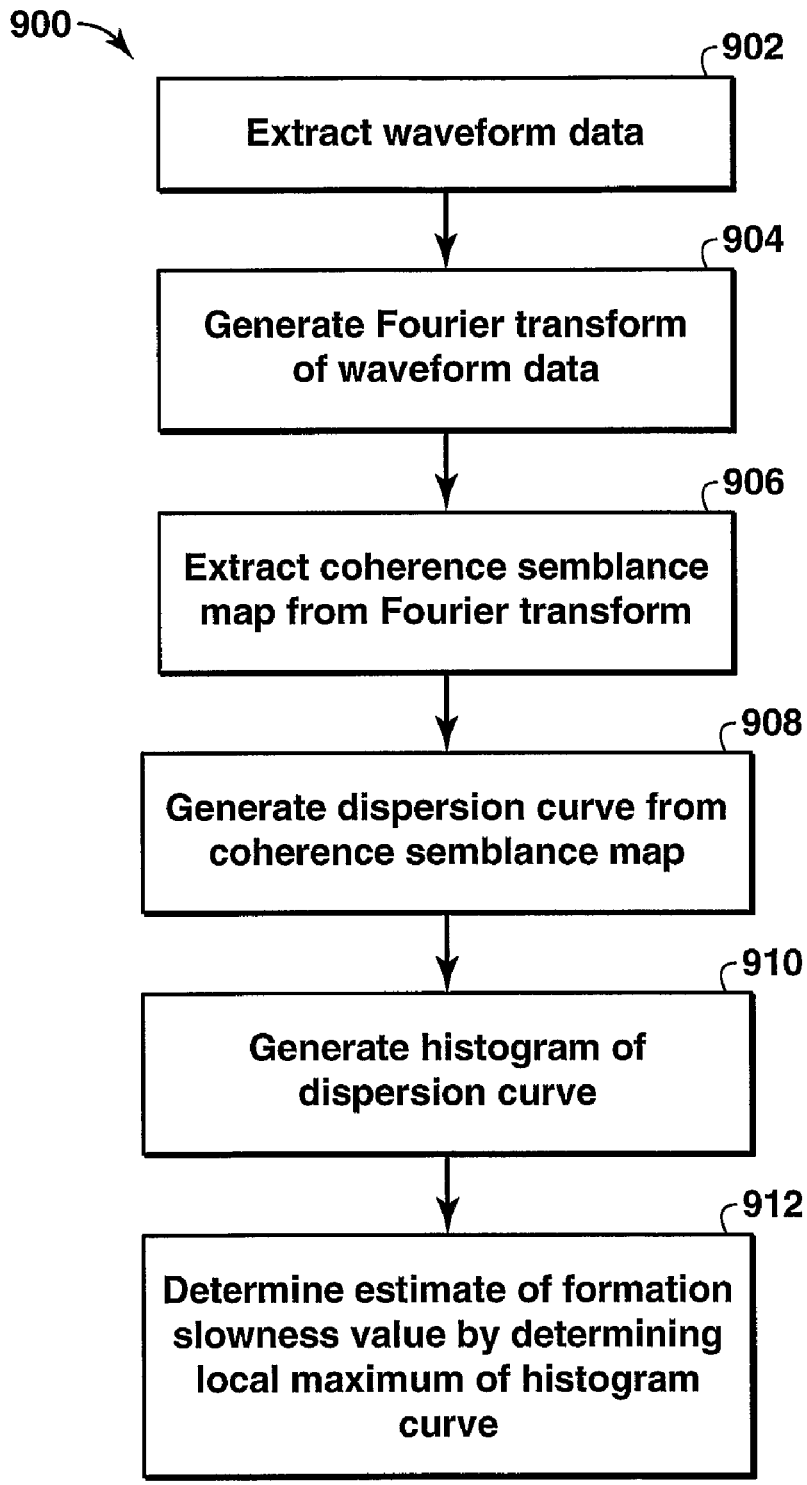
FIG. 9A is a flow chart illustration of an exemplary embodiment of a method for operating the system of FIG. 1.
Figure 9B:
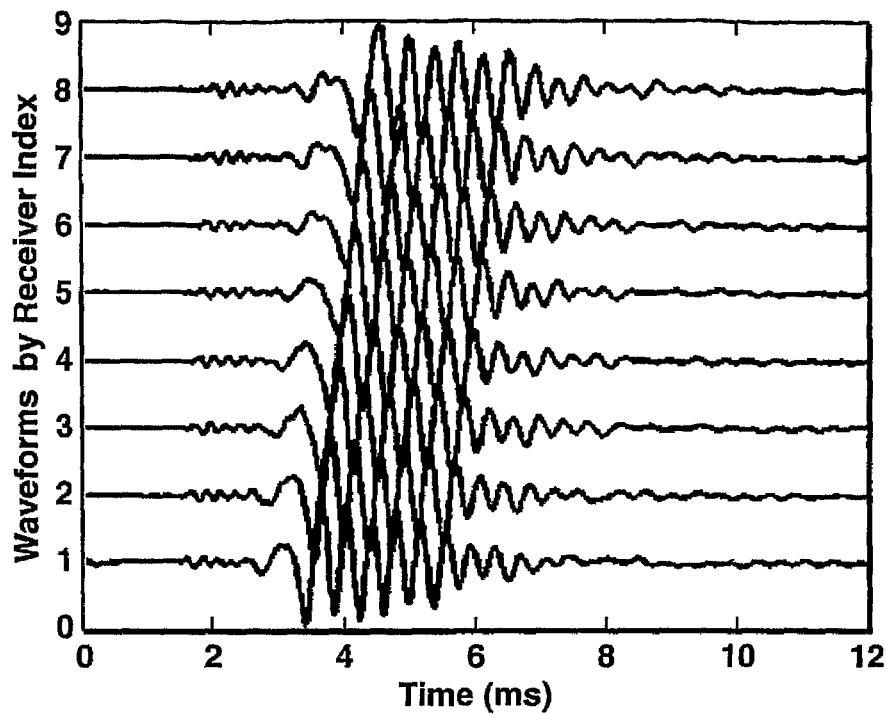
FIG. 9B is a graphical illustration of an exemplary embodiment of typical waveforms detected during the operation of the method of FIG. 9A.

Referring to FIG. 9A, in an exemplary embodiment, the system 100 implements a method 900 for estimating a value for the formation slowness in which, in step 902, waveform data $w_i(t)$, for i=1 to N, where N=number of acoustic receivers 104, as illustrated in FIG. 9B, are extracted by operating the acoustic transmitter 102 and acoustic receivers 104 in a conventional manner. A Fourier transform $W_i(f)$, where i varies from 1 to N of the extracted acoustic data is then generated in step 904. In an exemplary embodiment, in step 904, the $N_{fft}$ value used for generating the Fourier transform $W_i(f)$ is selected to be at least four times longer than the time domain signal $w_i(t)$.

Figure 9C:
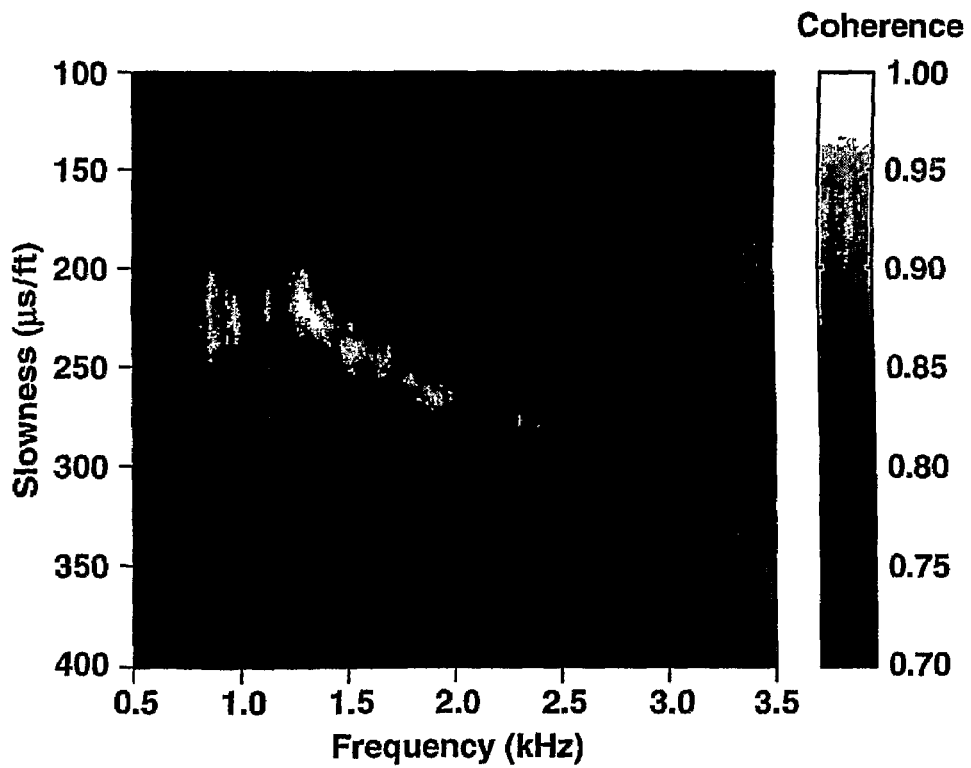
FIG. 9C is a graphical illustration of an exemplary embodiment of a coherence semblance map extracted during the operation of the method of FIG. 9A.
Figure 9D:
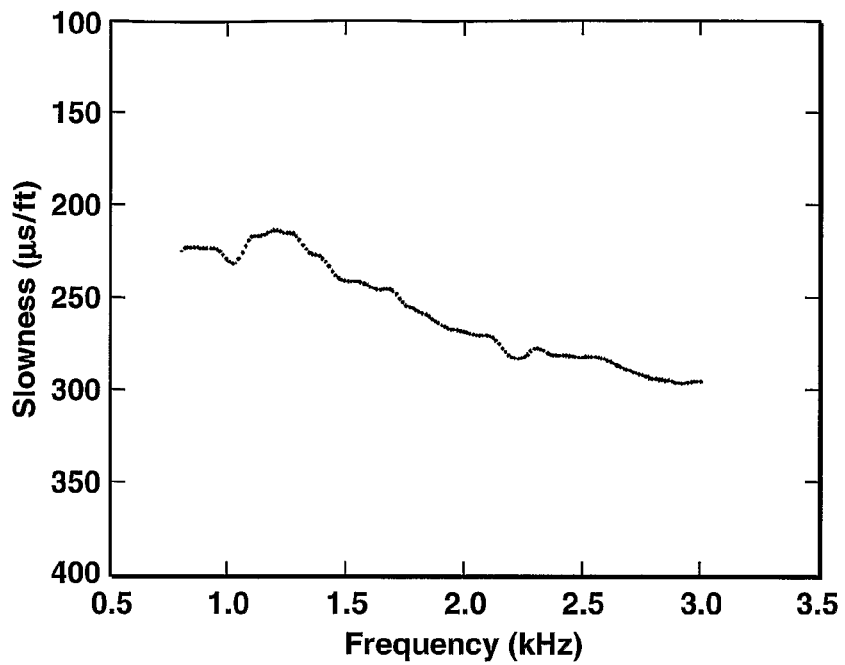
FIG. 9D is an exemplary embodiment of a dispersion curve extracted during the operation of the method of FIG. 9A.

A coherence semblance map P(DT, f), where DT=slowness, as illustrated in FIG. 9C, is then generated from the Fourier transform $W_i(f)$ in step 906. In an exemplary embodiment, the coherence semblance map P(DT, f) is generated from the Fourier transform $W_i(f)$ in step 906 using the methodology as disclosed in Nolte et al. A dispersion curve DTp(f), as illustrated in FIG. 9D, is then generated from the coherence semblance map P(DT, f) in step 908 in accordance with the following equation:

$$DTp(f) = \underset{DT}{max}(P(DT,f))$$

Figure 9E:
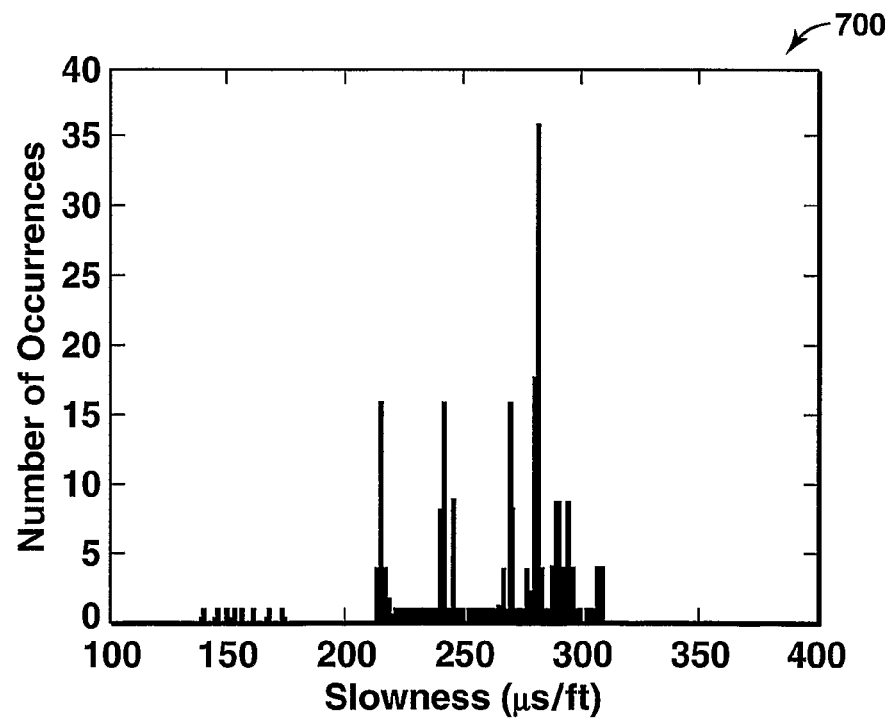
FIG. 9E is an exemplary embodiment of a histogram extracted during the operation of the method of FIG. 9A.

A histogram H(DT) of the dispersion curve DTp(f), as illustrated in FIG. 9E, is then determined in step 910 in a conventional manner, with histogram bins corresponding to different slownesses. An estimate of the value of the formation slowness DTE is then determined in step 912 by determining the slowness bin with a local maximum of histogram H(DT). In many cases, the slowest local maximum (e.g., located at a slowness of about 215 μs/ft in FIG. 9E) corresponds closely with the formation shear slowness, and the fastest local maximum apparent in the histogram corresponds closely with the Schölte solid-fluid slowness. By searching for a significant end peak in the histogram, step 912 avoids setting the slowness based on noisy outliers in the data.

Several alternatives exist for accumulating the histogram H(DT) of the dispersion curve DTp(f). First, as disclosed above, the dispersion curve can be plotted as values corresponding to the coherence semblance map points that the dispersion curve overlays, such that the histogram accumulates the maximum coherence value observed at each frequency. This approach values histogram contributions at frequencies where a stronger coherence is observed more than frequencies where less coherence is observed. The dispersion curve can alternately be plotted using a fixed value (such as 1) for each point, with the histogram accumulating these fixed values. The histogram can alternately be weighted by a weighting factor, e.g., some selected characteristic of the data, such as the wave spectra, the slowness-frequency coherence value, and combinations of such characteristic data.

The histogram approach has been explained with the use of visual coherence semblance maps and dispersion curves in order to aid understanding of the approach. Those skilled in the art appreciate, however, that the mathematical process for arriving at the histogram from the waveform data does not require these visual constructs. This approach can therefore be implemented using functions that search for the slowness having the maximum coherence at each frequency, and increment the corresponding histogram bin by the weighted or unweighted coherence value, as desired.

In several exemplary embodiments, the operational steps of the method 900 may be performed by one or more elements of the system 100. In an exemplary embodiment, the method 900 is implemented by the system 100 when the system operates in one of the following modes of operation: 1) wireline leaky-P (DTC); or 2) dipole (DTS).

Figure 10A:
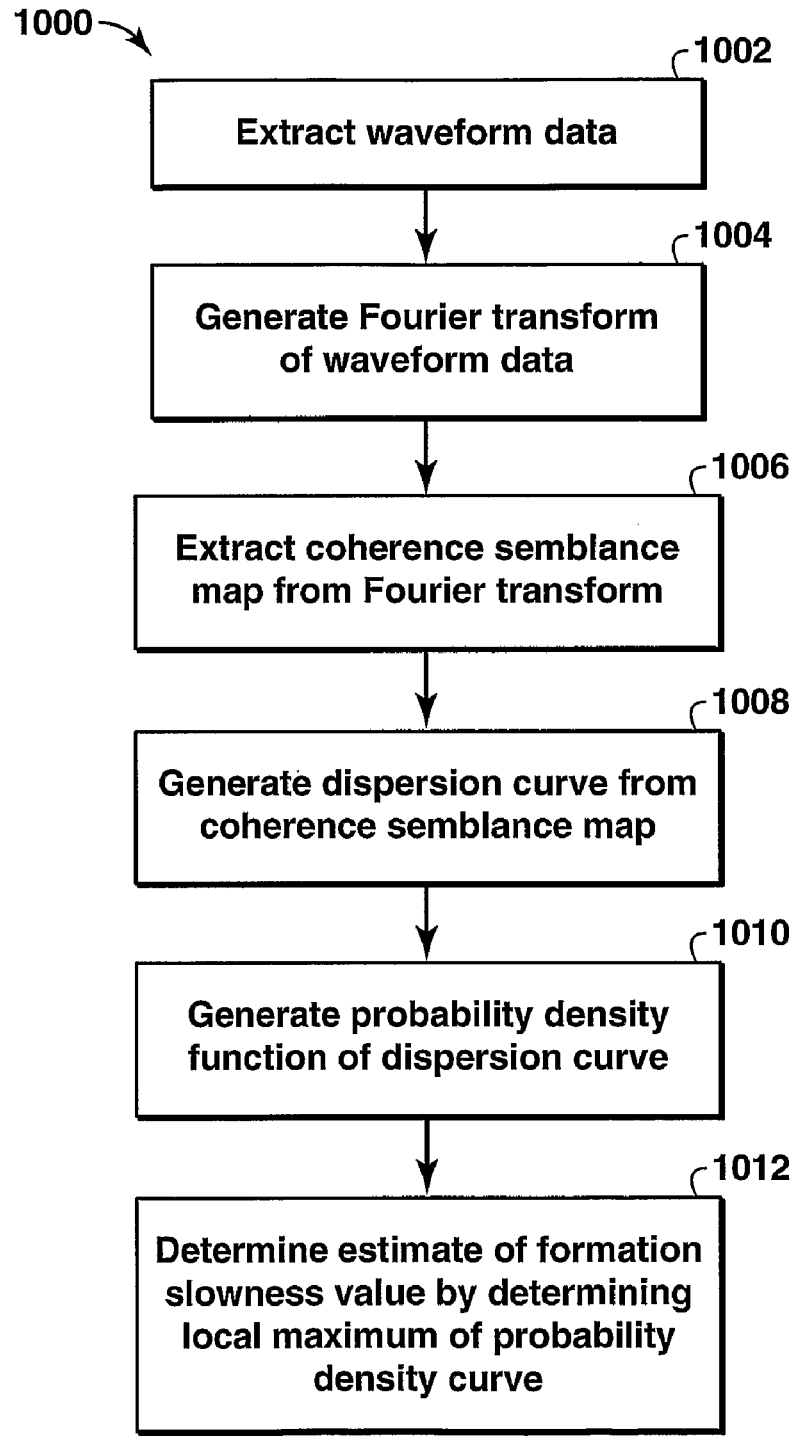
FIG. 10A is a flow chart illustration of an exemplary embodiment of a method for operating the system of FIG. 1.
Figure 10B:
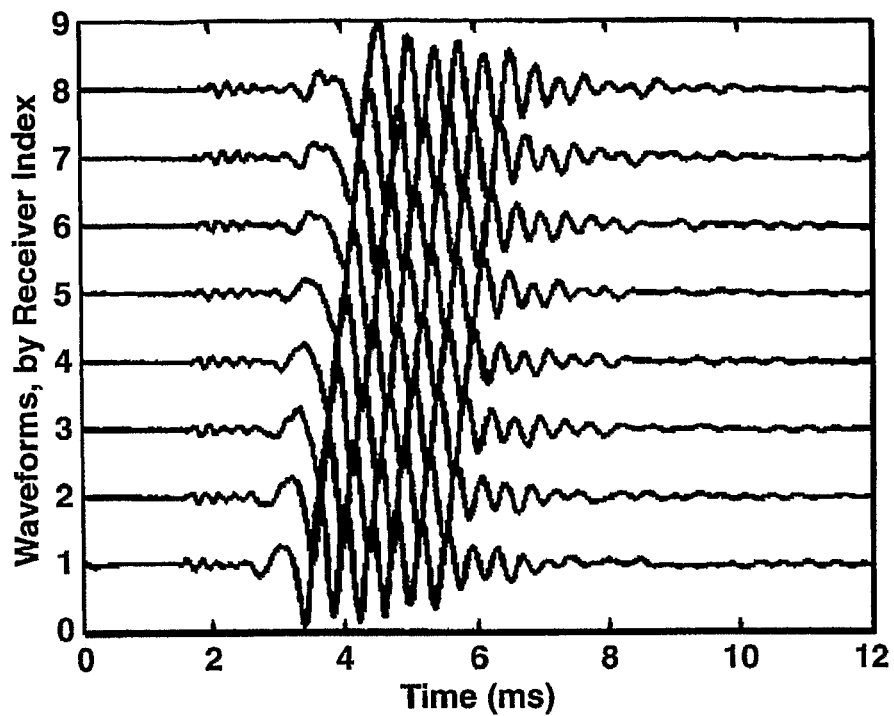
FIG. 10B is a graphical illustration of an exemplary embodiment of typical waveforms detected during the operation of the method of FIG. 10A.

Referring to FIG. 10A, in an exemplary embodiment, the system 100 implements a method 1000 for estimating a value for the formation slowness in which, in step 1002, waveform data $w_i(f)$, for i=1 to N, where N=number of acoustic receivers 104, as illustrated in FIG. 10B, are extracted by operating the acoustic transmitter 102 and acoustic receivers 104 in a conventional manner. A Fourier transform $W_i(f)$, where i varies from 1 to N, of the extracted acoustic data is then generated in step 1004. In an exemplary embodiment, in step 1004, the $N_{fft}$ value used for generating the Fourier transform $W_i(f)$ is selected to be at least four times longer than the time domain signal $w_i(f)$.

Figure 10C:
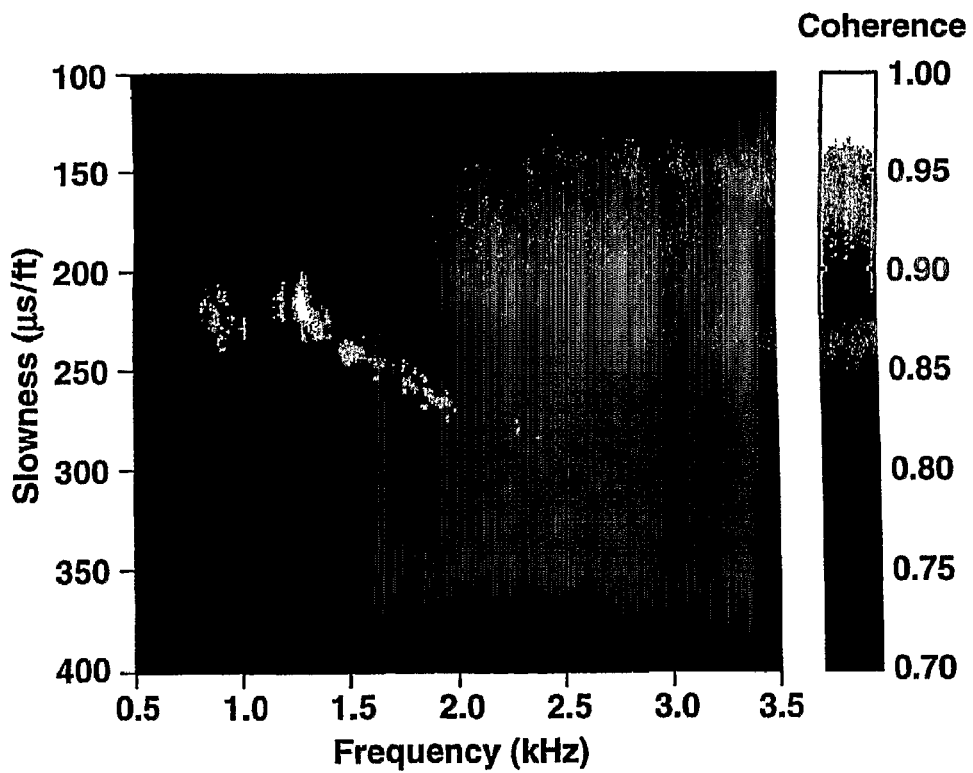
FIG. 10C is a graphical illustration of an exemplary embodiment of a coherence semblance map extracted during the operation of the method of FIG. 10A.
Figure 10D:
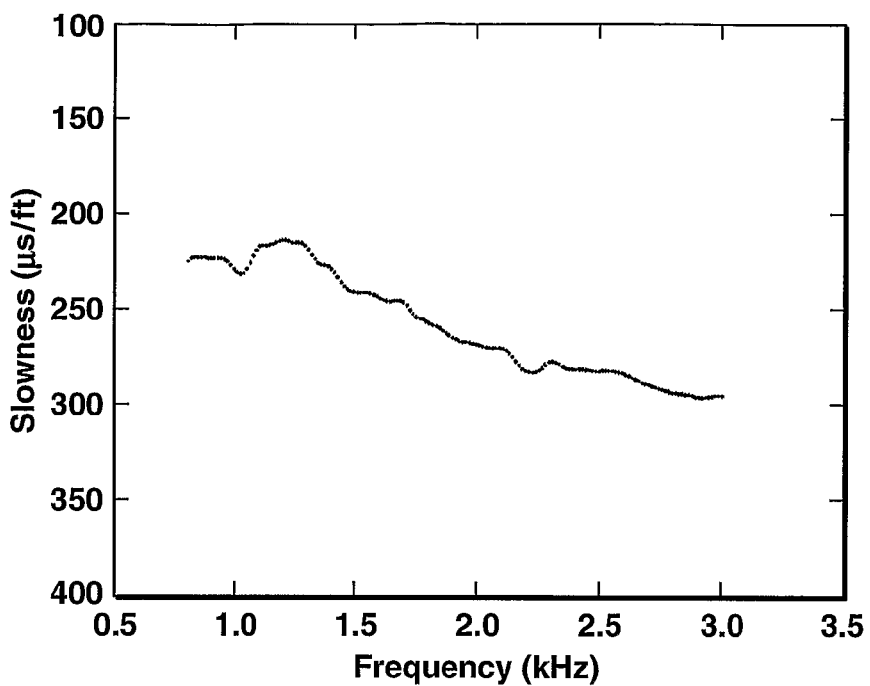
FIG. 10D is an exemplary embodiment of a dispersion curve extracted during the operation of the method of FIG. 10A.

A coherence semblance map P(DT, f), where DT=slowness, as illustrated in FIG. 10C, is then generated from the Fourier transform $W_i(f)$ in step 1006. In an exemplary embodiment, the coherence semblance map P(DT, f) is generated from the Fourier transform $W_i(f)$ in step 1006 using the methodology as disclosed in Nolte et al. A dispersion curve DTp(f), as illustrated in FIG. 10D, is then generated from the coherence semblance map P(DT, f) in step 1008 in accordance with the following equation:

$$DTp(f) = \underset{DT}{max}(P(DT, f))$$

Figure 10E:
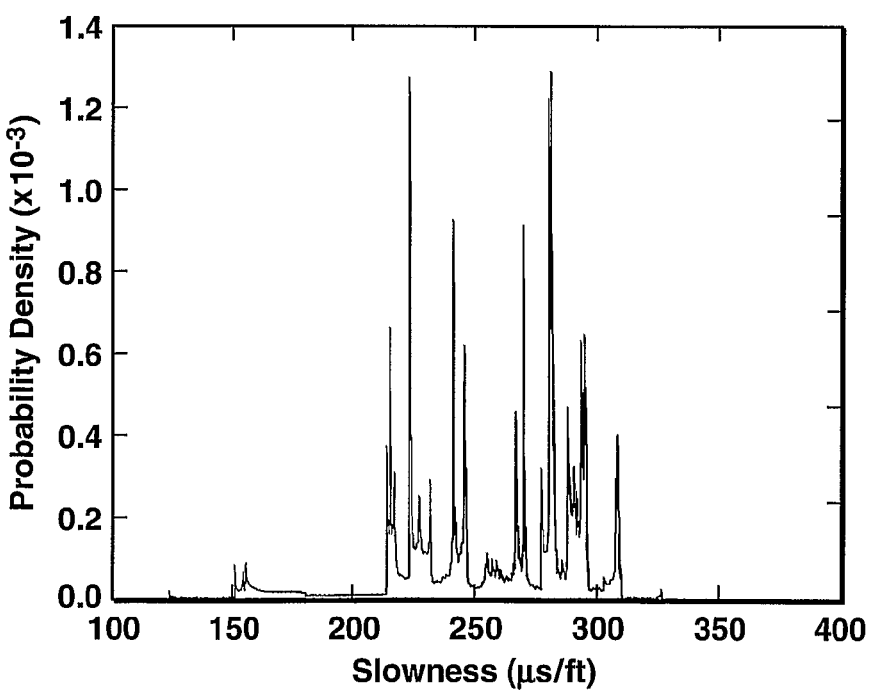
FIG. 10E is an exemplary embodiment of a probability density function extracted during the operation of the method of FIG. 10A.

A probability density function PDF(DT) of the dispersion curve DTp(f), as illustrated in FIG. 10E, is then determined in step 1010 in a conventional manner. An estimate of the value of the formation slowness DTE is then determined in step 1012 by determining the local maximum of the probability density function PDF(DT).

In several exemplary embodiments, the operational steps of the method 1000 may be performed by one or more elements of the system 100. In an exemplary embodiment, the method 1000 is implemented by the system 100 when the system operates in one of the following modes of operation: 1) wireline leaky-P (DTC); or 2) dipole (DTS).

Figure 11A:
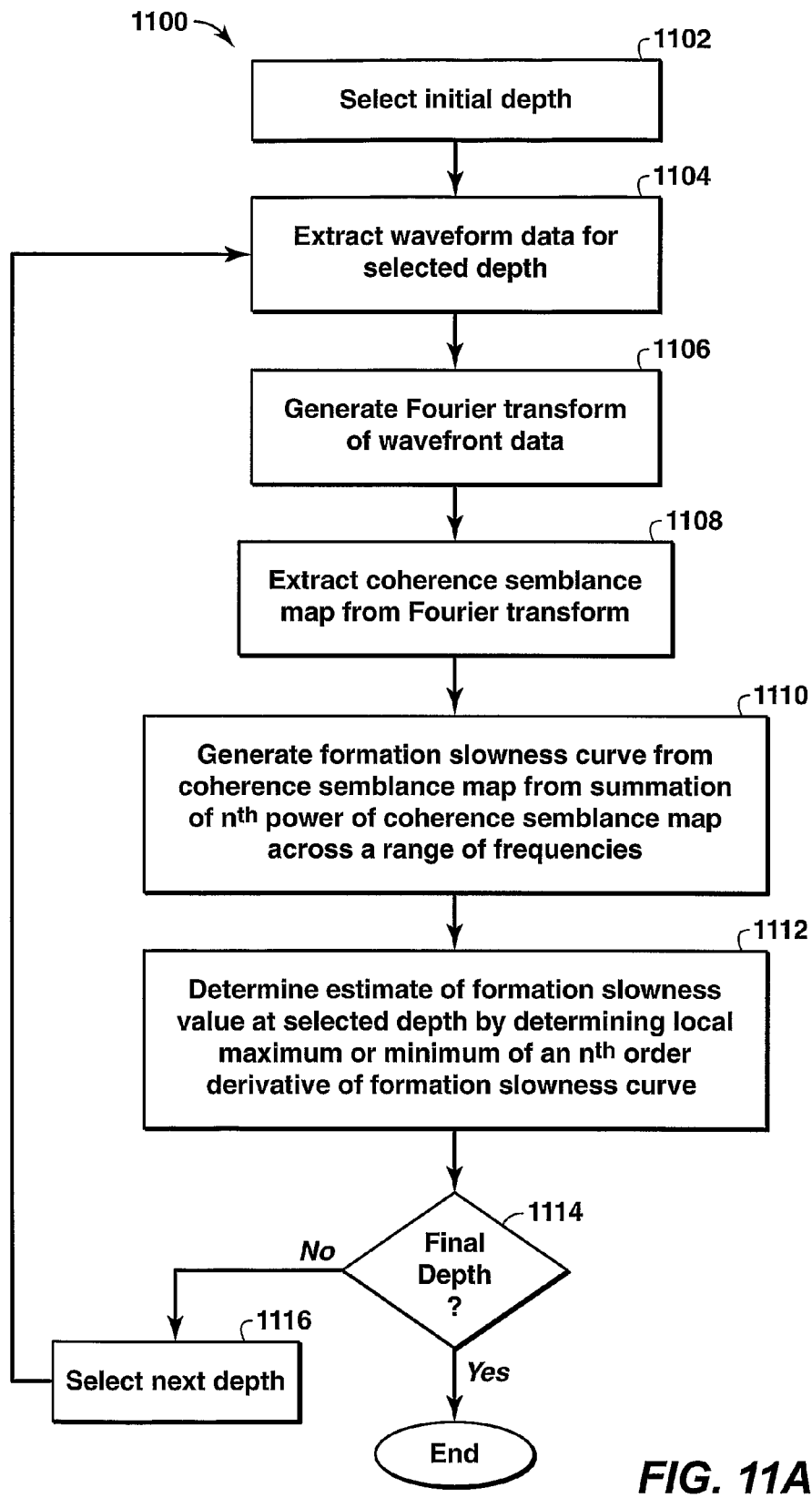
FIG. 11A is a flow chart illustration of an exemplary embodiment of a method for operating the system of FIG. 1.
Figure 11B:
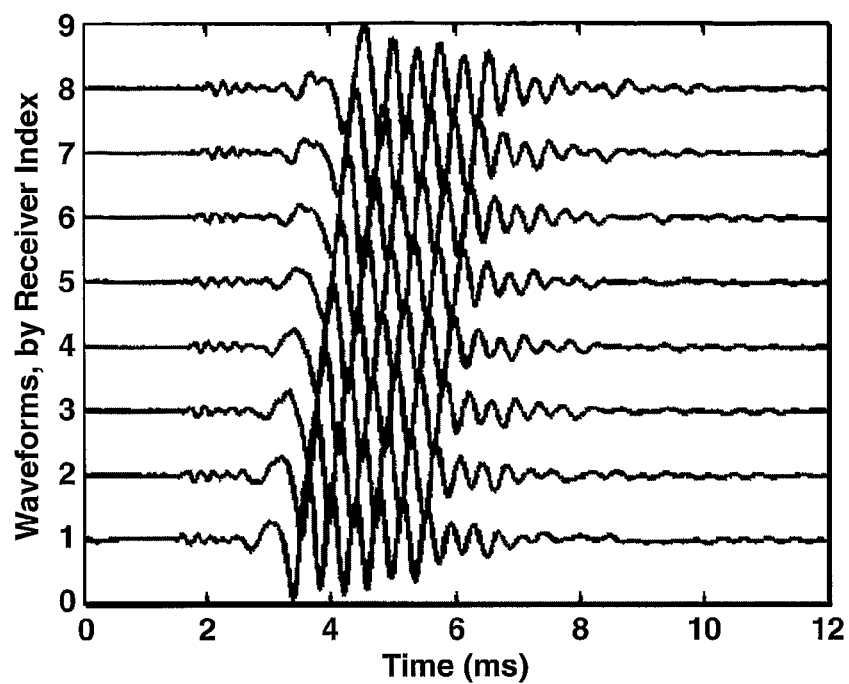
FIG. 11B is a graphical illustration of an exemplary embodiment of typical waveforms detected during the operation of the method of FIG. 11A.

Referring to FIG. 11A, in an exemplary embodiment, the system 100 implements a method 1100 for estimating a value for the formation slowness in which, in step 1102, an initial depth is selected. Waveform data $w_i(f)$, for i=1 to N, where N=number of acoustic receivers 104, as illustrated in FIG. 11B, are then extracted at the selected depth by operating the acoustic transmitter 102 and acoustic receivers 104 in a conventional manner in step 1104. A Fourier transform $W_i(f)$, where i varies from i to N, of the extracted acoustic data is then generated in step 1106. In an exemplary embodiment, in step 1106, the $N_{fft}$ value used for generating the Fourier transform $W_i(f)$ is selected to be at least four times longer than the time domain signal $W_i(t)$.

Figure 11C:
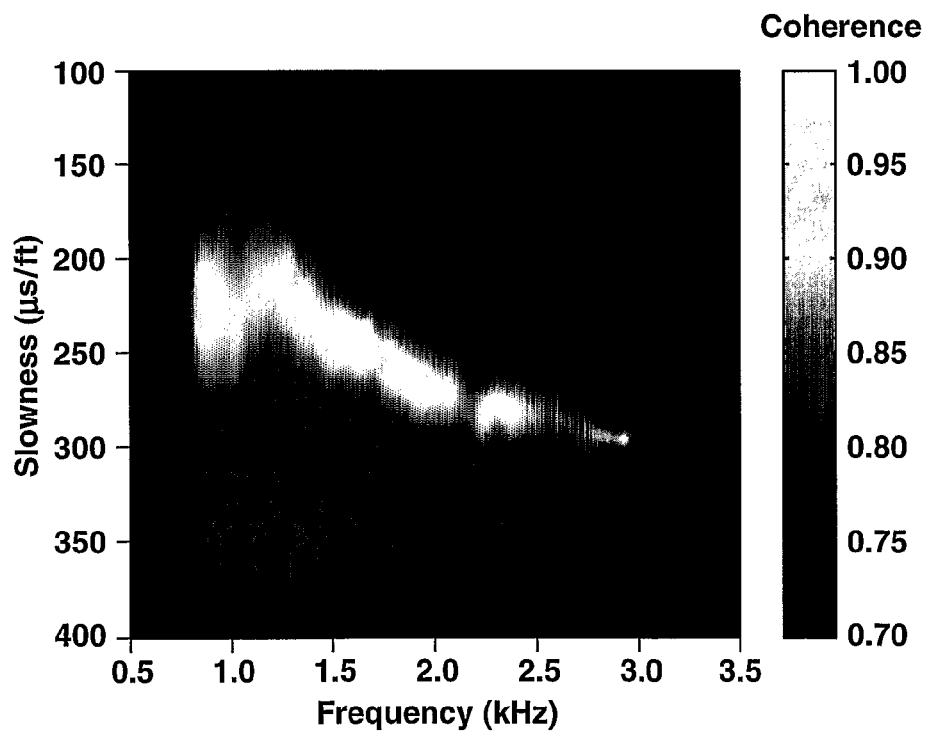
FIG. 11C is a graphical illustration of an exemplary embodiment of a coherence semblance map extracted during the operation of the method of FIG. 11A.

A coherence semblance map P(DT, f), where DT=slowness, as illustrated in FIG. 11C, is then generated from the Fourier transform $W_i(f)$ in step 1108. In an exemplary embodiment, the coherence semblance map P(DT, f) is generated from the Fourier transform $W_i(f)$ in step 1108 using the methodology as disclosed in Nolte et al. A formation slowness curve E(DT), as illustrated in FIG. 11D, is then generated from the coherence semblance map P(DT, f) in step 1110 in accordance with the following equation:

$$E(DT) = \int_{fmin}^{fmax} P(DT, f)^n df$$

In an exemplary embodiment, the slowness curve E(DT) is generated in step 1110 by a summation of the coherence semblance map P(DT, f) for a range of frequencies and slownesses.

Figure 11D:
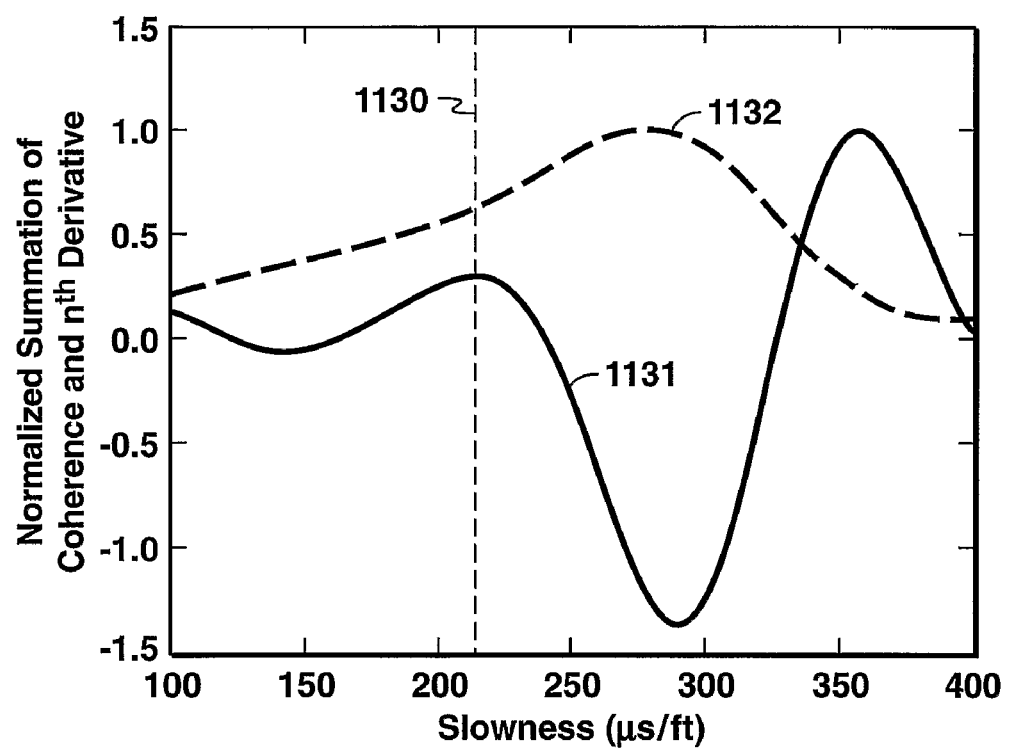
FIG. 11D is an exemplary embodiment of a formation slowness curve extracted during the operation of the method of FIG. 11A.

As illustrated in FIG. 11D, an estimate 1130 of the value of the formation slowness DTE for the selected depth is then determined in step 1112 by determining the local maximum of an $n^{th}$ order derivative 1131 of the slowness curve E(DT), which is 1132 in FIG. 11D, in accordance with the following equation:

$$DTE = \underset{DT}{MAX} \frac{\partial^n (E)}{\partial DT^n}$$

In an exemplary embodiment, in steps 1110 and 1112, the optimal value for n may vary as a function of the operating conditions. As a result, in an exemplary embodiment, the optimal value for n, in steps 1110 and 1112, may be determined using an empirical analysis.

If the selected depth is the final depth, the method 1100 then ends in step 1114. Alternatively, if the selected depth is not the final depth, then the next depth is selected in step 1116, and the method 1100 then proceeds to implement steps 1104, 1106, 1108, 1110, and 1112 in order to determine the estimate of the value of the formation slowness DTE for the next selected depth. As a result, the method 1100 thereby generates a formation slowness curve DTE(depth) providing the estimated formation slowness values for the range of selected depths.

In several exemplary embodiments, the operational steps of the method 1100 may be performed by one or more elements of the system 100. In an exemplary embodiment, the method 1100 is implemented by the system 100 when the system operates in the following mode of operation: LWD P-LOG.

Figure 12B:
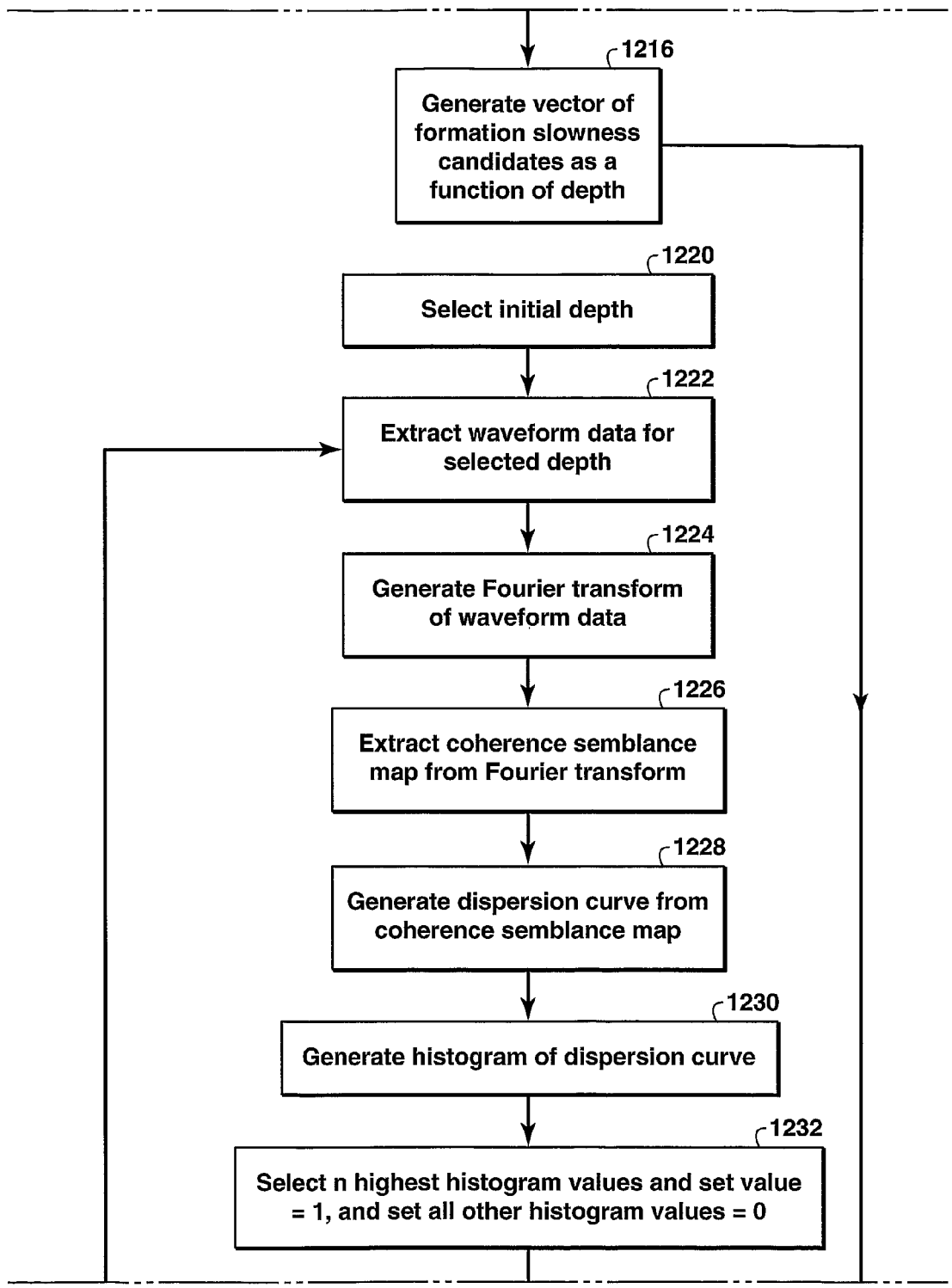
Figure 12C:
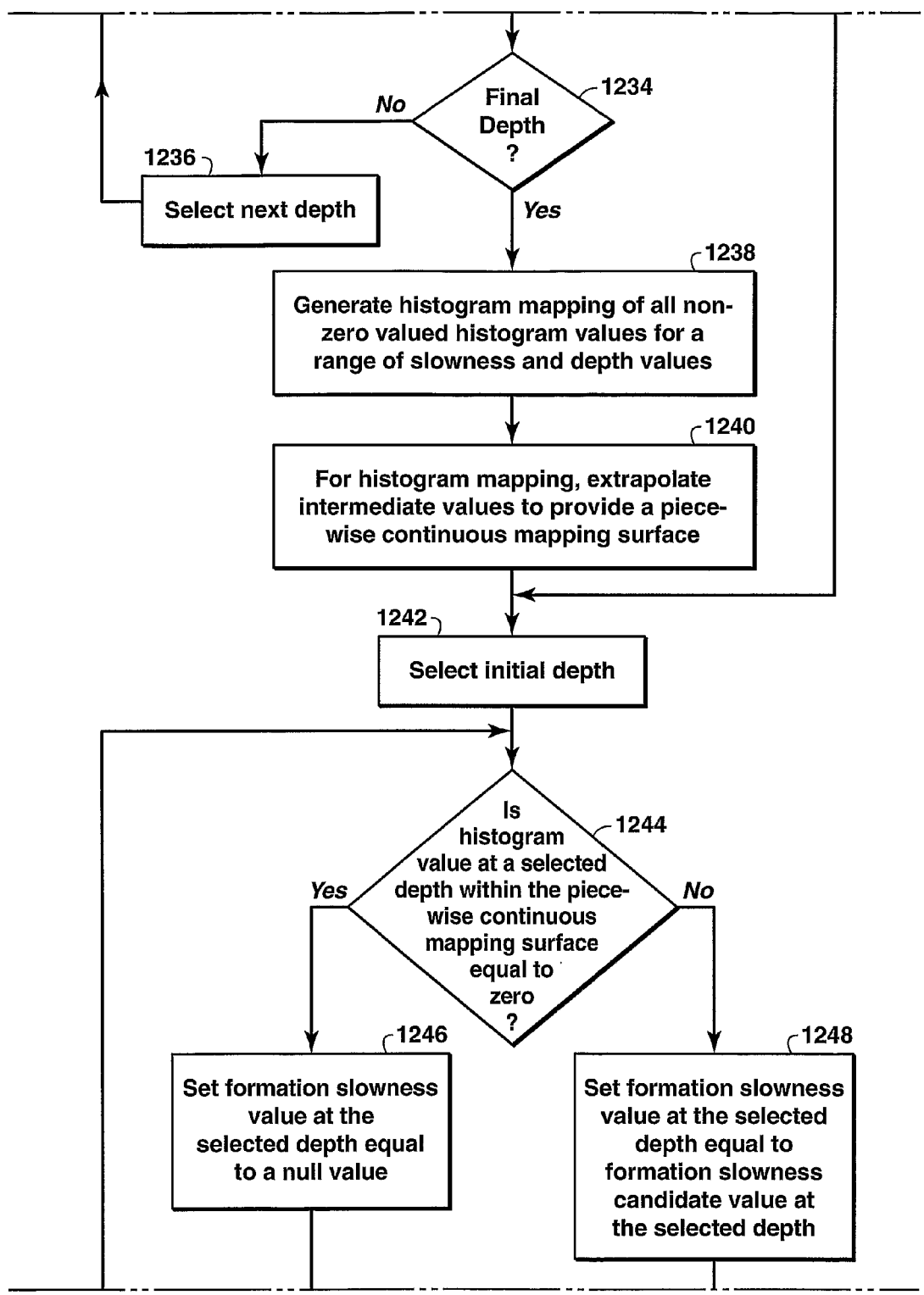
Figure 12D:
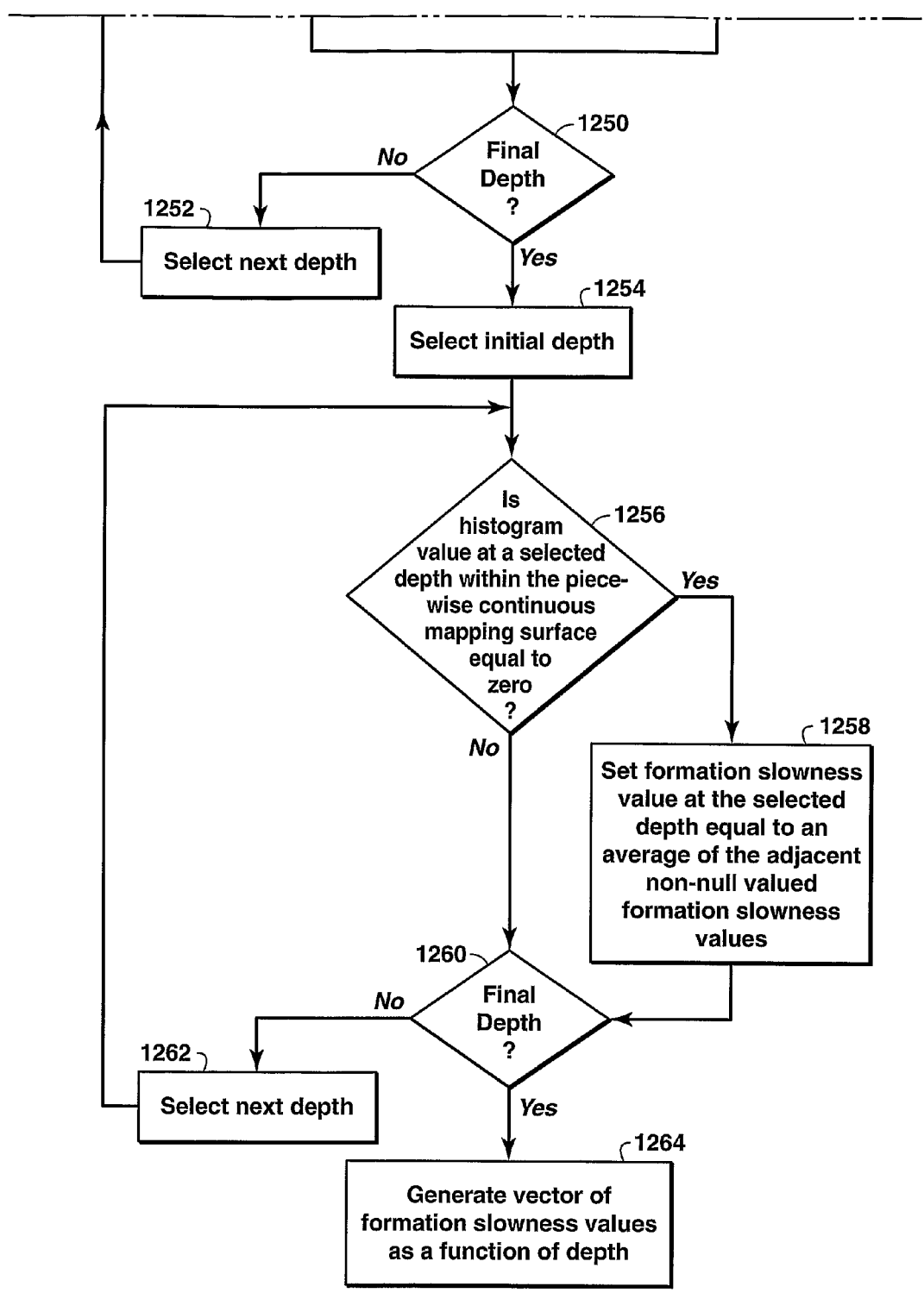
Figure 12I:
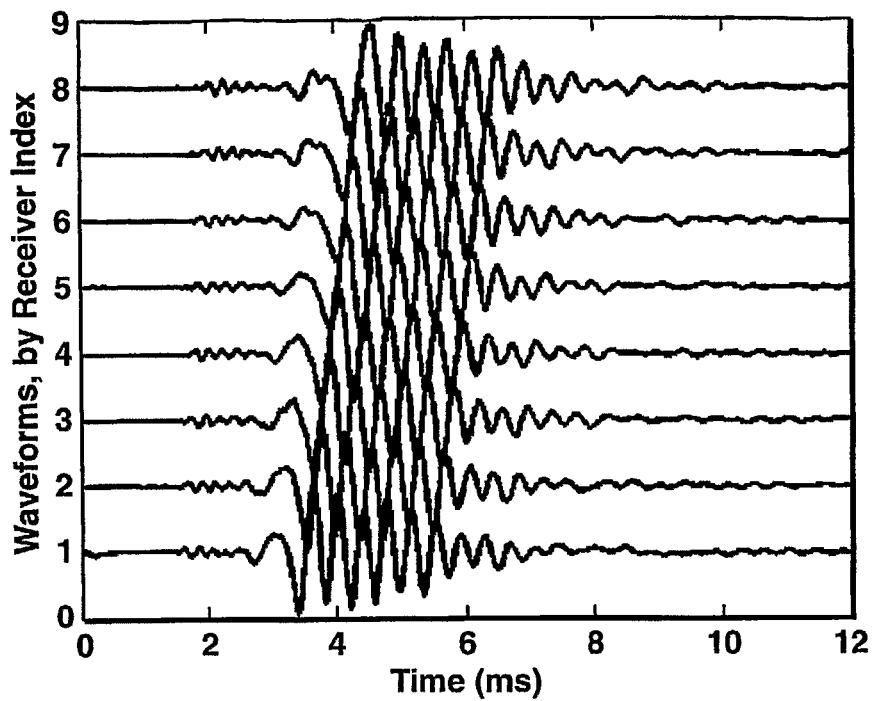
FIG. 12I is a graphical illustration of an exemplary embodiment of typical waveforms detected during the operation of the method of FIGS. 12A-D.

Referring to the flowchart of FIGS. 12A-D, in an exemplary embodiment, the system 100 implements a method 1200 for estimating a value for the formation slowness in which, in step 1202, an initial depth is selected. Waveform data $w_i(t)$, for i=1 to N, where N=number of acoustic receivers 104, as illustrated in FIG. 12I, are then extracted at the selected depth by operating the acoustic transmitter 102 and acoustic receivers 104 in a conventional manner in step 1204. A Fourier transform $W_i(f)$, where i varies from i to N, of the extracted acoustic data is then generated in step 1206. In an exemplary embodiment, in step 1206, the $N_{fft}$ value used for generating the Fourier transform $W_i(f)$ is selected to be at least four times longer than the time domain signal $w_i(t)$.

Figure 12J:
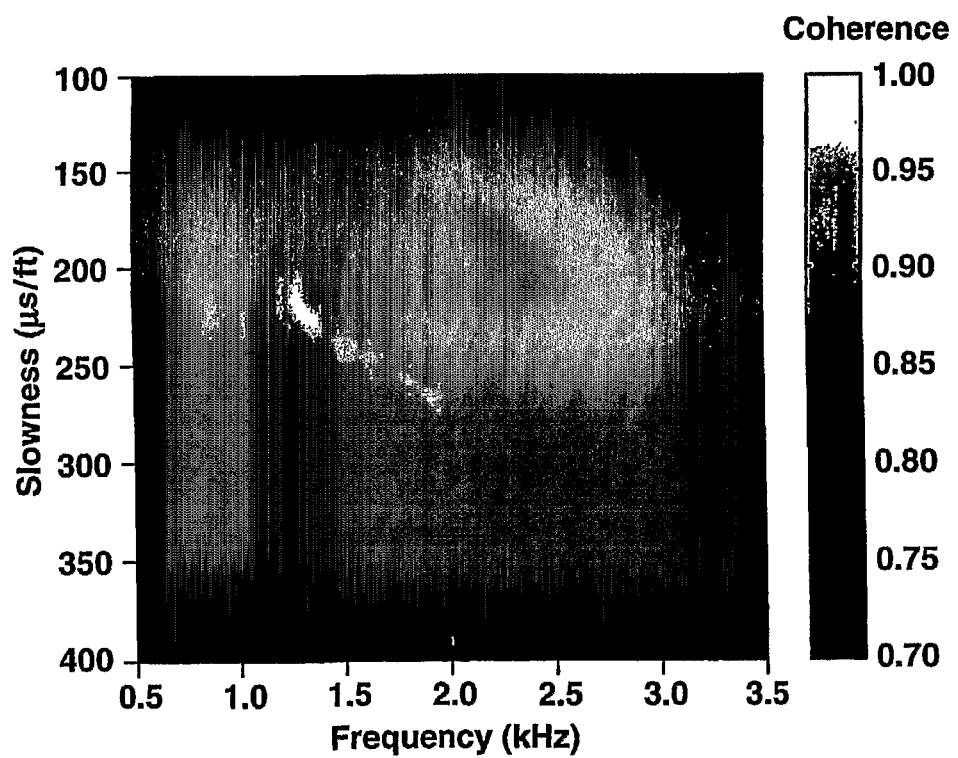
FIG. 12J is a graphical illustration of an exemplary embodiment of a coherence semblance map extracted during the operation of the method of FIGS. 12A-D.

A coherence semblance map P(DT, f), where DT=slowness, as illustrated in FIG. 12J, is then generated from the Fourier transform $W_i(f)$ in step 1208. In an exemplary embodiment, the coherence semblance map P(DT, f) is generated from the Fourier transform $W_i(f)$ in step 1108 using the methodology as disclosed in Nolte et al. A formation slowness curve E(DT), as illustrated in FIG. 12K, is then generated from the coherence semblance map P(DT, f) in step 1210 in accordance with the following equation:

$$E(DT) = \int_{fmin}^{fmax} P(DT, f)^n df$$

In an exemplary embodiment, the slowness curve E(DT) is generated in step 1210 by a summation of the coherence semblance map P(DT, f) for a range of frequencies and slownesses.

Figure 12K:
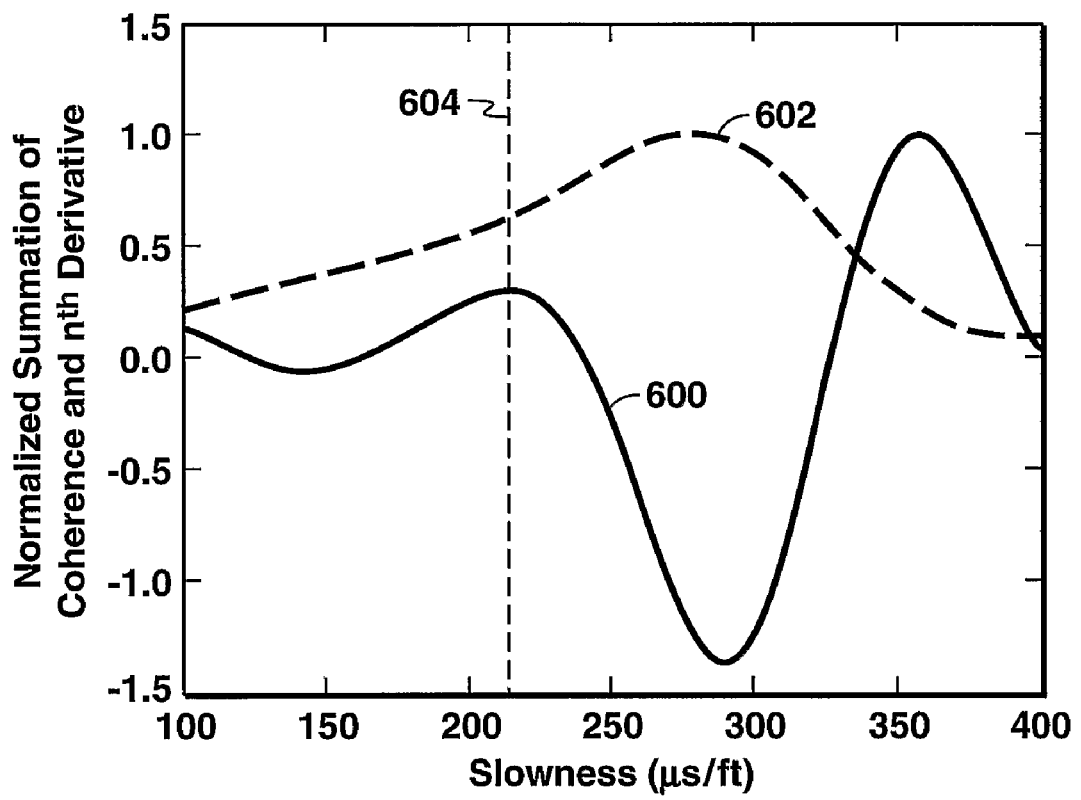
FIG. 12K is an exemplary embodiment of a formation slowness curve extracted during the operation of the method of FIGS. 12A-D.

As illustrated in FIG. 12K, a value for a candidate of the formation slowness $DTE_{candidate}$ for the selected depth is then determined in step 1212 by determining the local maximum of an $n^{th}$ order derivative of the slowness curve E(DT) in accordance with the following equation:

$$DTE_{candidate} = \underset{DT}{MAX} \frac{\partial^n (E)}{\partial DT^n}$$

In an exemplary embodiment, in steps 1210 and 1212, the optimal value for n may vary as a function of the operating conditions. As a result, in an exemplary embodiment, the optimal value for n, in steps 1210 and 1212, may be determined using an empirical analysis.

If the selected depth is the final depth, the method 1200 then generates a vector $DTE_{candidate}$(depth) in step 1216. Alternatively, if the selected depth is not the final depth, then the next depth is selected in step 1218, and the method 1200 then proceeds to implement steps 1204, 1206, 1208, 1210, and 1212 in order to determine the value for a candidate of the formation slowness $DTE_{candidate}$ for the next selected depth.

In step 1220, an initial depth is selected, and Waveform data $w_i(t)$, for i=1 to N, where N=number of acoustic receivers 104, as illustrated in FIG. 12I, are extracted at the selected depth by operating the acoustic transmitter 102 and acoustic receivers 104 in a conventional manner in step 1222. A Fourier transform $W_i(f)$ where i varies from 1 to N, of the extracted acoustic data is generated in step 1222. In an exemplary embodiment, in step 1224, the $N_{fft}$ value used for generating the Fourier transform $W_i(f)$ is selected to be at least four times longer than the time domain signal $w_i(t)$.

Figure 12L:
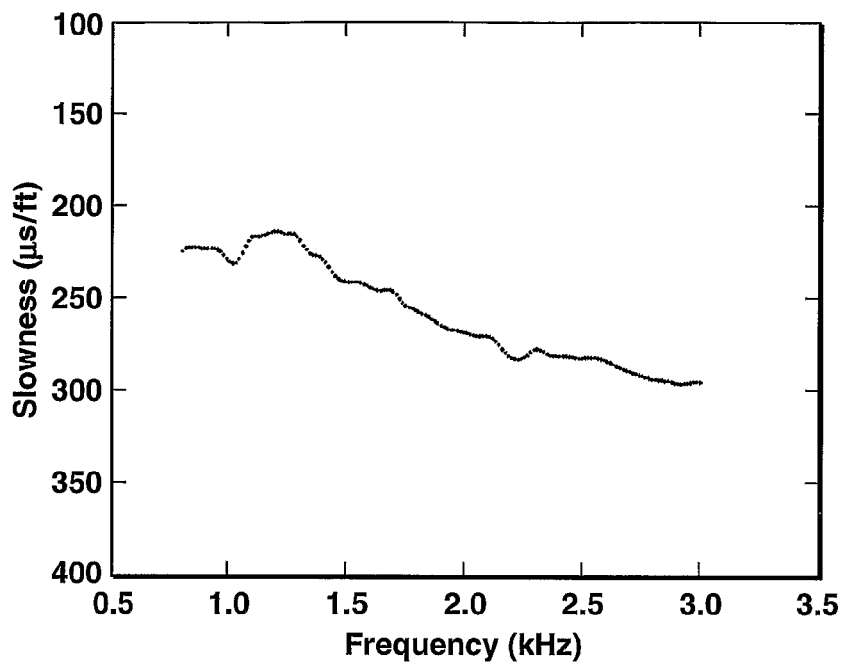
FIG. 12L is an exemplary embodiment of a dispersion curve extracted during the operation of the method of FIGS. 12A-D.

A coherence semblance map P(DT, f), where DT=slowness, as illustrated in FIG. 12J, is generated from the Fourier transform $W_i(f)$ in step 1226. In an exemplary embodiment, the coherence semblance map P(DT, f) is generated from the Fourier transform $W_i(f)$ in step 1226 using the methodology as disclosed in Nolte et al. A dispersion curve DTp(f), as illustrated in FIG. 12L, is then generated from the coherence semblance map P(DT, f) in step 1228 in accordance with the following equation:

$$DTp(f) = \underset{DT}{max} P(DT, f))$$

Figure 12M:
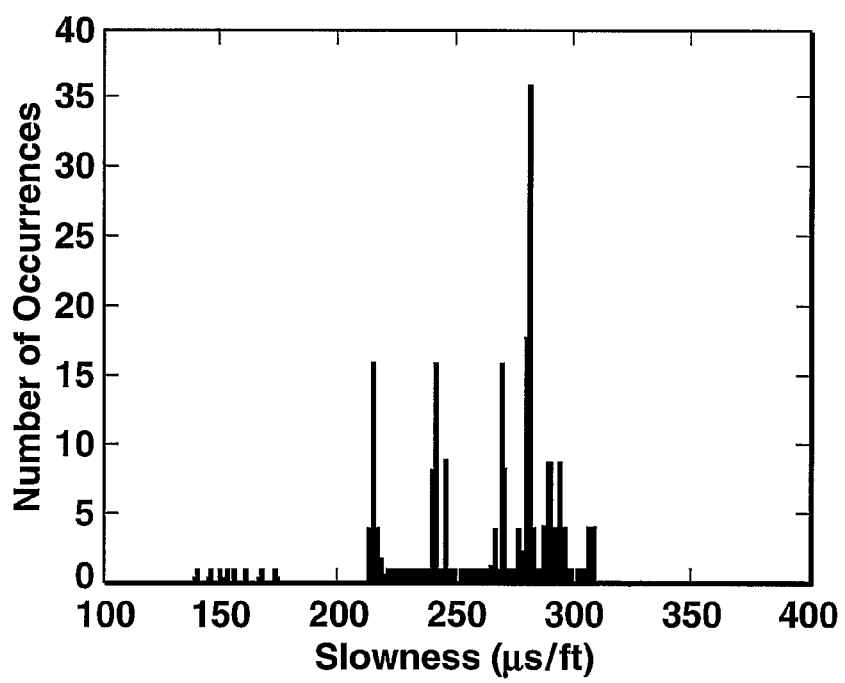
FIG. 12M is an exemplary embodiment of a histogram extracted during the operation of the method of FIGS. 12A-D.

A histogram H(DT), as illustrated in FIG. 12M, of the dispersion curve DTp(f) is then generated in step 1230 in a conventional manner. A modified histogram H'(DT) is then generated in step 1232 by processing the histogram H(DT) by selecting the N highest valued histogram values and setting their value to 1, and setting the value of all other histogram values to zero, within the histogram H(DT).

If the selected depth is not determined to be the final depth in step 1234, then the next depth is selected in step 1236, and the method 1200 then proceeds to implement steps 1222, 1224, 1226, 1228, 1230, and 1232 in order to determine the histogram H'(DT) for the next selected depth.

Figure 12N:
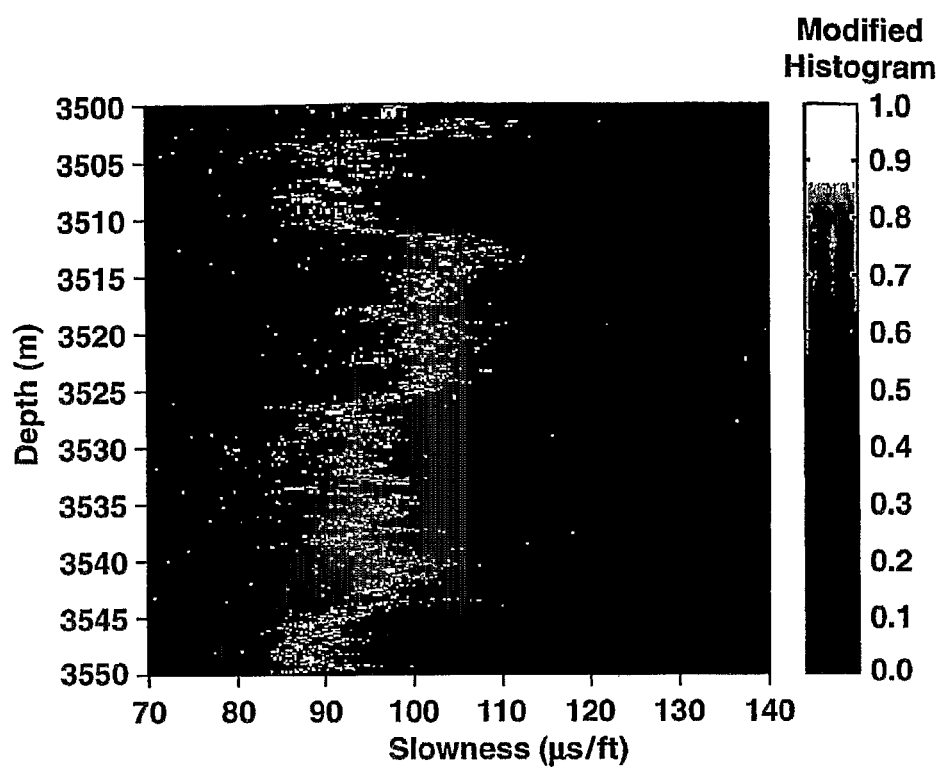
FIG. 12N is an exemplary embodiment of a histogram mapping extracted during the operation of the method of FIGS. 12A-D.
Figure 12O:
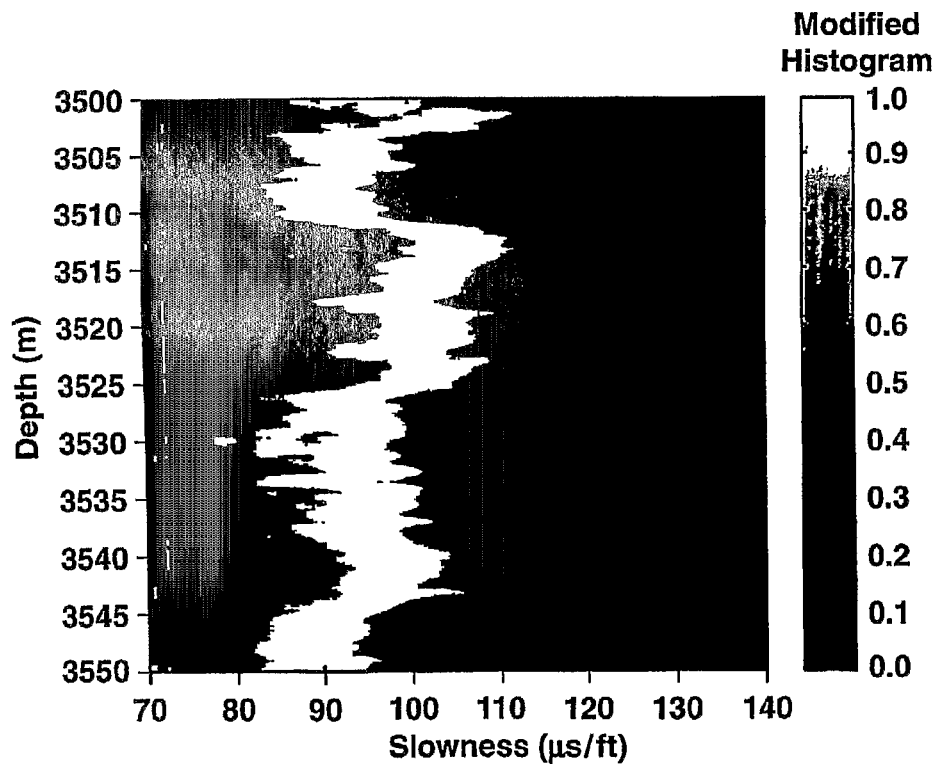
FIG. 12O is an exemplary embodiment of a piece-wise continuous histogram mapping extracted during the operation of the method of FIGS. 12A-D.

If the selected depth is determined to be the final depth in step 1234, then a histogram mapping H'(DT,depth), as illustrated in FIG. 12N, for all non-zero valued histogram values is generated in step 1238 and a piece-wise continuous histogram mapping H"(DT,depth), as illustrated in FIG. 12O, is generated in step 1240 by extrapolating intermediate values within the histogram mapping.

In an exemplary embodiment, steps 1202, 1204, 1206, 1208, 1210, 1212, 1214, and 1216 of the method 1200 may be performed in parallel with, and may use common inputs and/or outputs of, steps 1220, 1222, 1224, 1226, 1228, 1230, 1232, 1234, 1236, 1238, and 1240 of the method 1200.

In step 1242, an initial depth is selected, and if the value of the piece-wise continuous histogram mapping H"(DT,depth) at the selected depth is found to be equal to zero in step 1244, then the formation slowness DTE(depth) at the selected depth is set to a NULL VALUE in step 1246. Alternatively, if the value of the piece-wise continuous histogram mapping H"(DT,depth) at the selected depth is not found to be equal to zero in step 1244, then the formation slowness DTE(depth) at the selected depth is set to be equal to the formation slowness $DTE_{candidate}$ (depth) at the selected depth in step 1248.

If the selected depth is not the final depth in step 1250, then the next depth is selected in step 1252, and the steps 1244, 1246, 1248, and 1250 are then repeated, as required. If the selected depth is the final depth in step 1250, then the method 1200 proceeds to step 1254 and selects an initial depth.

Figure 12P:
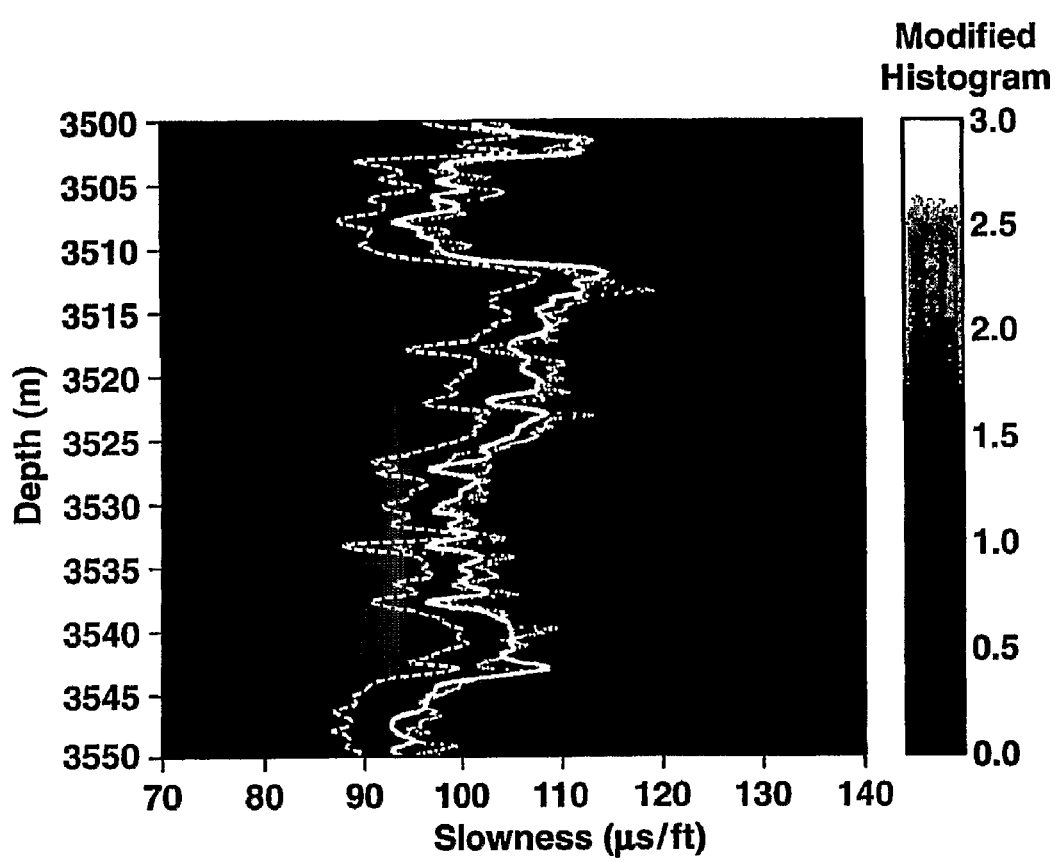
FIG. 12P is an exemplary embodiment of a piece-wise continuous histogram mapping extracted during the operation of the method of FIGS. 12A-D.

If the value of the piece-wise continuous histogram mapping H"(DT,depth) at the selected depth is found to be equal to a NULL VALUE in step 1256, then the formation slowness DTE(depth) at the selected depth is set to an average of the closest adjacent non-NULL valued formation slowness values within DTE(depth) in step 1258. Alternatively, if the value of the piece-wise continuous histogram mapping H"(DT,depth) at the selected depth is not found to be equal to a NULL VALUE in step 1256, or following step 1258, if the selected depth is not the final depth in step 1260, then the next depth is selected in step 1262, and the steps 1256, 1258, and 1260 are then repeated, as required. If the selected depth is the final depth in step 1260, then the method 1200 proceeds to step 1264 and generates the vector DTE(depth), which contains the formation slowness values determined by the present inventive method for the range of selected depths as illustrated in FIG. 12P. In that drawing, the dotted-line curve represents the present inventive method using waveform data acquired in an oil field by a logging-while-drilling ("LWD") tool. For comparison, the other curves show results obtained by conventional methods using LWD data (dashed line) and using waveform data obtained by separate wireline monopole logging after completion of drilling (solid line).

In several exemplary embodiments, the operational steps of the method 1200 may be performed by one or more elements of the system 100. In an exemplary embodiment, the method 1200 is implemented by the system 100 when the system operates in the following mode of operation: LWD P-log.

In an exemplary embodiment, during the operation of the methods 800, 900, 1000, 1100, and 1200, the coherence semblance map P(DT, f) is generated from the Fourier transform $W_i(f)$, in steps 806, 906, 1006, 1108, 1208 and 1226, respectively, using the following equation:

$$P(DT, f) = \frac{\left| \sum_{i=1}^{N} W_i(f) e^{j2\pi f \cdot DT \cdot (i-1) \cdot \Delta z} \right|}{\left( \sum_{i=1}^{N} |W_i(f)|^2 \right)^{1/2}}$$

where:
DT=slowness;
f=frequency;
P(DT,f)=coherence semblance map for a range of frequencies (f) and slownesses (DT);
$W_i(f)$=Fourier transform of the waveform data $w_i(t)$;
$\Delta z$=spacing between the acoustic receivers 104; and the relationship between $W_i(f)$ and $w_i(t)$ is given the following relationship:

$$w_i(t) = \int_{-\infty}^{\infty} W_i(f) e^{-j2\pi f t} 2\pi df$$

Figure 13A:
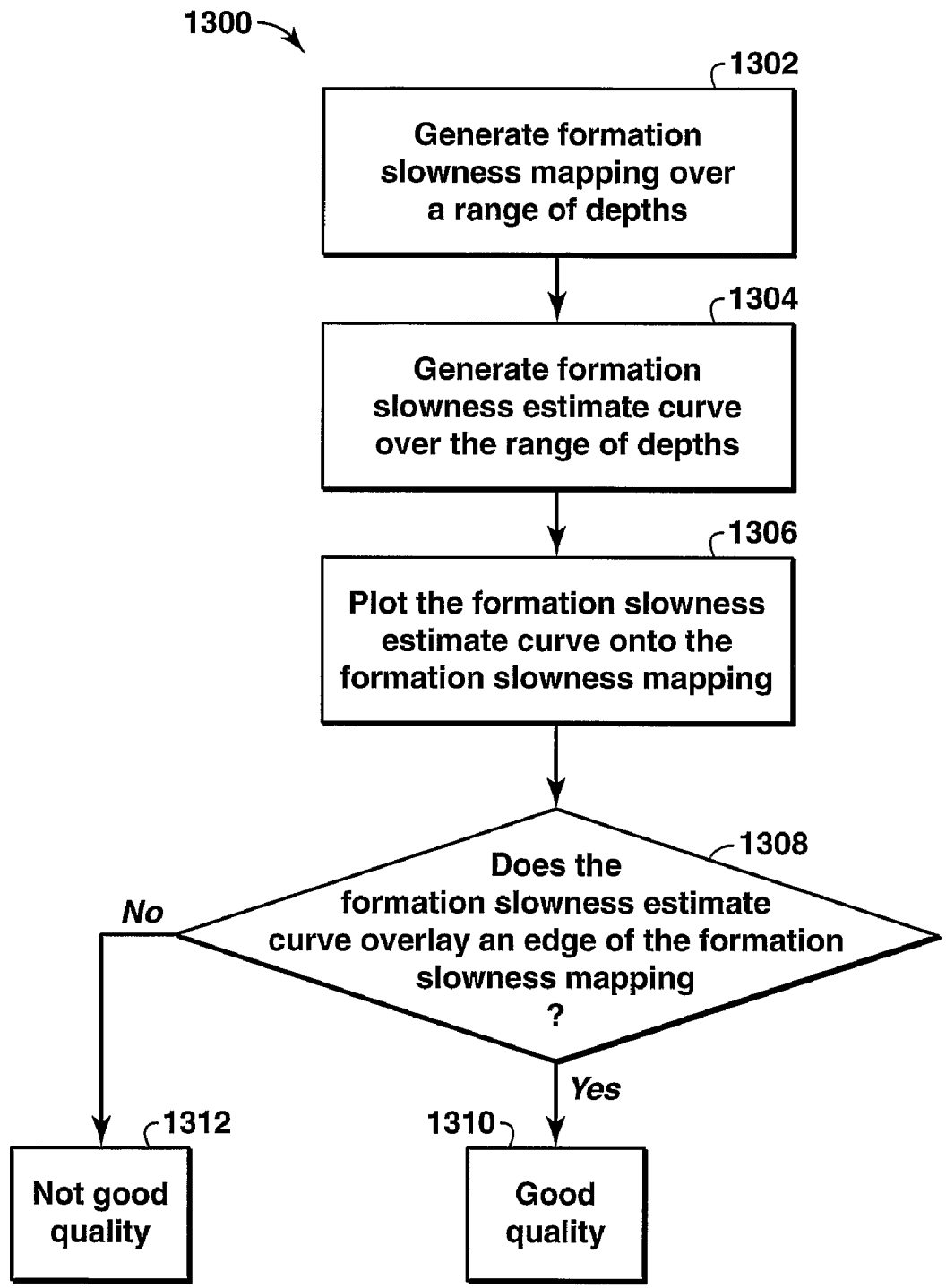
FIG. 13A is a flow chart illustration of an exemplary embodiment of a quality control method for operating the system of FIG. 1.

Referring to FIG. 13A, in an exemplary embodiment, the system 100 implements a quality control method 1300 in which a formation slowness mapping E(DT,depth), where DT=slowness, is generated in step 1302 by generating slowness curves E(DT) for a range of operating depths. A formation slowness estimate curve DTE(depth) is then generated in step 1304 for the range of operating depths selected in step 1302.

Figure 13B:
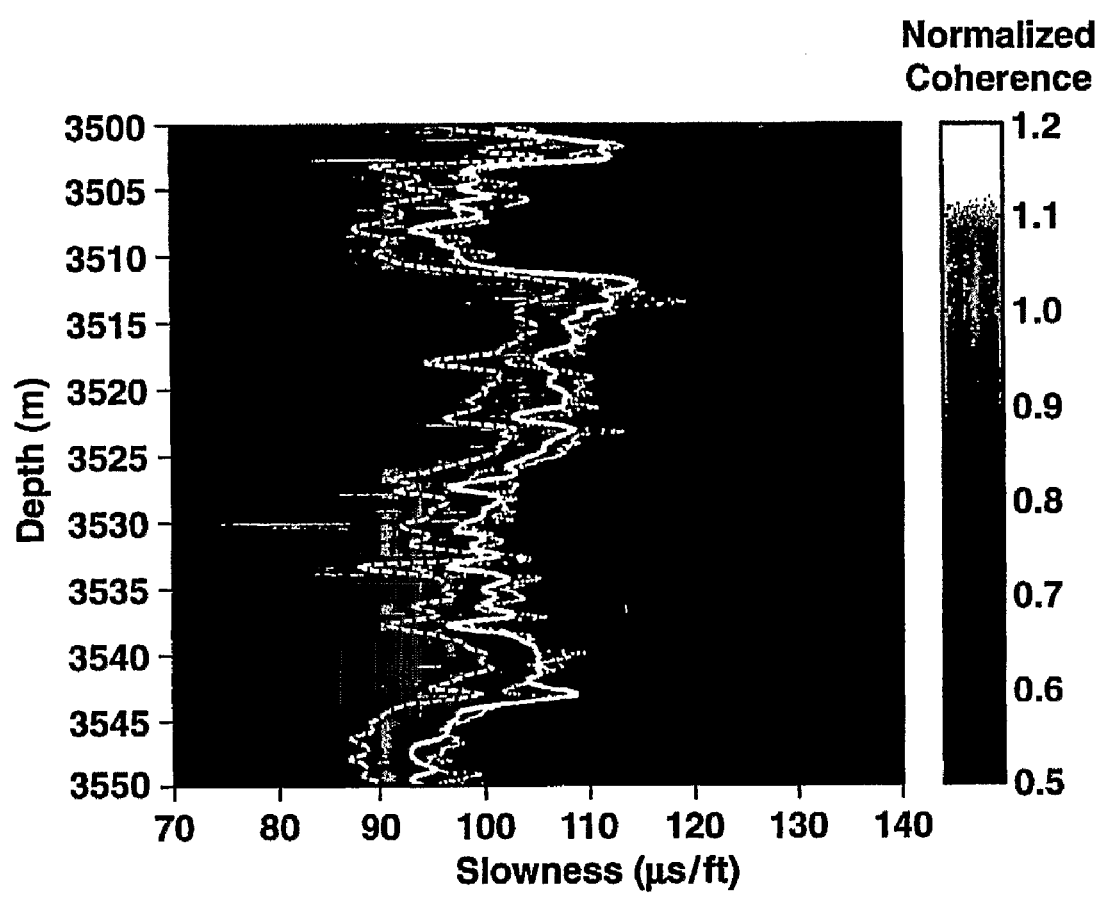
FIG. 13B is a graphical illustration of an exemplary embodiment of the plotting of a formation slowness estimate curve onto a formation slowness mapping of the method of FIG. 13A.

The formation slowness estimate curve DTE(depth) is then plotted onto the formation slowness mapping E(DT,depth) in step 1306, as illustrated in FIG. 13B. If it is determined that the formation slowness estimate curve DTE(depth) overlays an edge of the formation slowness mapping E(DT,depth) in step 1308, then it is determined that the quality of the slowness estimate curve DTE(depth) is good in step 1310. Alternatively, if it is determined that the formation slowness estimate curve DTE(depth) does not overlay an edge of the formation slowness mapping E(DT,depth) in step 1308, then it is determined that the quality of the slowness estimate curve DTE(depth) is not good in step 1312. In FIG. 13B, the dotted line curve represents the present inventive method using LWD data, and the other two curves are the results of conventional methods using LWD data (dashed line) and using data obtained by separate wireline monopole logging (solid line).

In an exemplary embodiment, the formation slowness mapping E(DT,depth) and the formation slowness estimate curve DTE(depth) may be generated in steps 1302 and 1304 using one or more of the operational steps of any one of the methods 400, 800, 900, 1000, 1100, and/or 1200 described above.

Figure 14A:
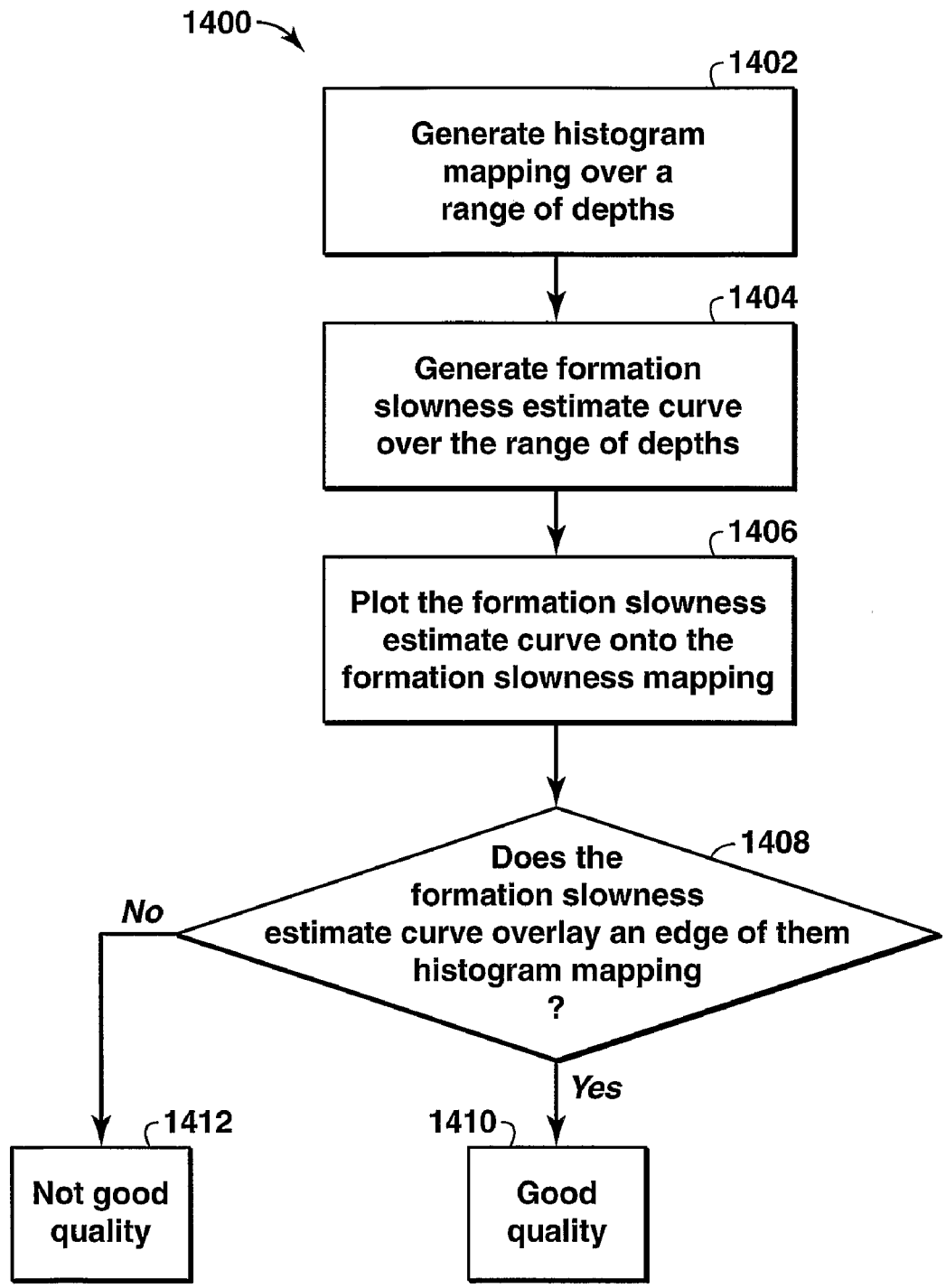
FIG. 14A is a flow chart illustration of an exemplary embodiment of a quality control method for operating the system of FIG. 1.

Referring to FIG. 14A, in an exemplary embodiment, the system 100 implements a quality control method 1400 in which a formation slowness histogram mapping H(DT, depth), where DT=slowness, is generated in step 1402 by generating slowness histograms H(DT) for a range of operating depths. A formation slowness estimate curve DTE(depth) is then generated in step 1404 for the range of operating depths selected in step 1302.

Figure 14B:
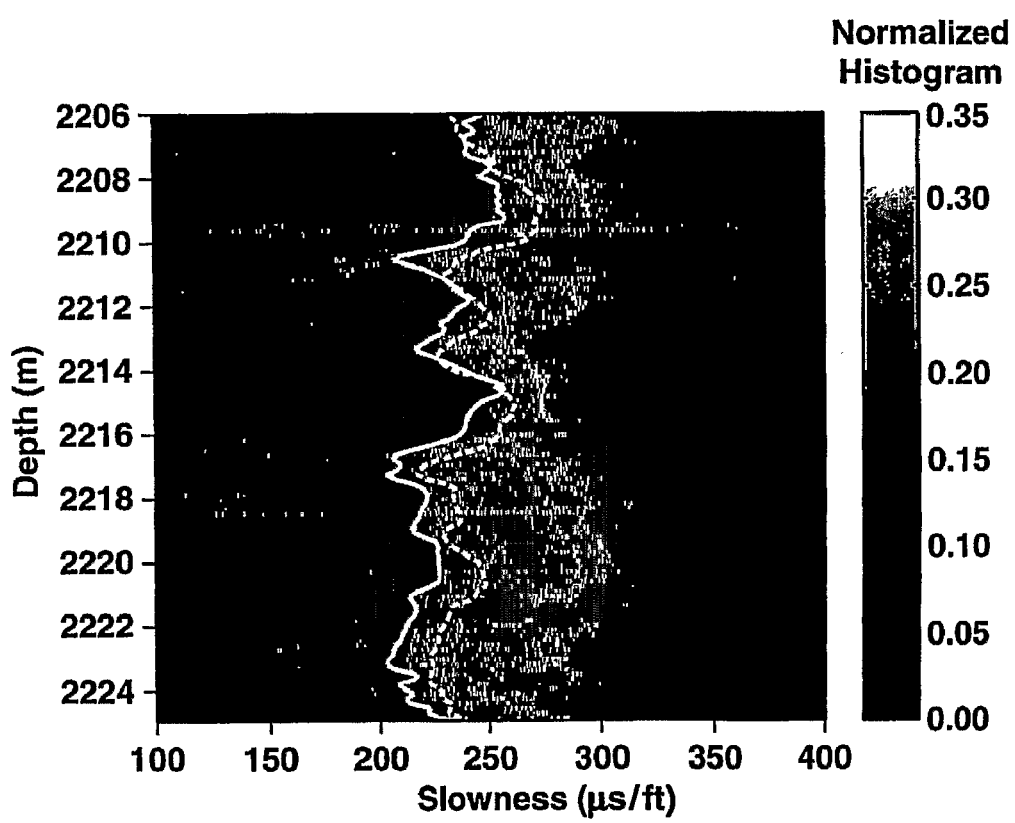
FIG. 14B is a graphical illustration of an exemplary embodiment of the plotting of a formation slowness estimate curve onto a slowness histogram mapping in of the method of FIG. 14A.

The formation slowness estimate curve DTE(depth) is then plotted onto the slowness histogram mapping H(DT,depth) in step 1406, as illustrated in FIG. 14B. If it is determined that the formation slowness estimate curve DTE(depth) overlays an edge of the slowness histogram mapping H(DT,depth) in step 1408, then it is determined that the quality of the slowness estimate curve DTE(depth) is good in step 1410. Alternatively, if it is determined that the formation slowness estimate curve DTE(depth) does not overlay an edge of the slowness histogram mapping H(DT,depth) in step 1408, then it is determined that the quality of the slowness estimate curve DTE(depth) is not good in step 1412. In FIG. 14B, the solid-line curve represents the present inventive method while the dashed-line curve shows results obtained using conventional methods.

In an exemplary embodiment, the formation slowness histogram mapping H(DT,depth) and the formation slowness estimate curve DTE(depth) may be generated in steps 1402 and 1404 using one or more of the operational steps of any one of the methods 400, 800, 900, 1000, 1100, and/or 1200 described above.

Further examples implementing features found in one or more exemplary embodiments may be found in Huang et al., "A Data-Driven Approach to Extract Shear and Compressional Slowness From Dispersive Waveform Data," paper and viewgraphs presented on Nov. 9, 2005 at the 75$^{th}$ Annual Meeting of the *Society of Exploration Geophysics*, Houston, Tex., Nov. 7-11, 2005.

A method of estimating formation slowness using waveforms recorded by an acoustic logging tool positioned within a borehole that traverses the formation has been described that includes extracting a phase slowness coherence of the recorded waveforms at a plurality of frequencies within a range of frequencies and phase slownesses; converting the extracted phase slowness coherence into a formation slowness curve whose magnitude is a function of the extracted phase slowness coherence; and determining one or more anomalies within the formation slowness curve; wherein the location of one of the anomalies of the formation slowness curve is representative of the estimated formation slowness. In an exemplary embodiment, the anomalies comprise local maxima of the formation slowness curve. In an exemplary embodiment, the anomalies comprise local minima of the formation slowness curve. In an exemplary embodiment, extracting a phase slowness coherence of the recorded waveforms at a plurality of frequencies within a range of frequencies and phase slownesses comprises generating a phase slowness coherence semblance map. In an exemplary embodiment, converting the extracted phase slowness coherence into a formation slowness curve whose magnitude is a function of the extracted phase slowness coherence comprises generating a summation of the phase slowness coherence for a range of frequencies and slownesses. In an exemplary embodiment, determining one or more anomalies within the formation slowness curve comprises determining an n$^{th}$ order derivative of the formation slowness curve. In an exemplary embodiment, converting the extracted phase slowness coherence into a formation slowness curve whose magnitude is a function of the extracted phase slowness coherence comprises converting the extracted phase slowness coherence into a dispersion curve; and generating a histogram of the dispersion curve. In an exemplary embodiment, the anomalies comprise local maxima of the histogram. In an exemplary embodiment, converting the extracted phase slowness coherence into a formation slowness curve whose magnitude is a function of the extracted phase slowness coherence comprises converting the extracted phase slowness coherence into a dispersion curve; and generating a probability density function of the dispersion curve. In an exemplary embodiment, the anomalies comprise local maxima of the probability density function. In an exemplary embodiment, the method further comprises positioning the logging tools within a wellbore that traverses a subterranean formation; and repeating the steps of extracting, converting and determining at a plurality of depths within the wellbore. In an exemplary embodiment, the method further includes generating a formation slowness mapping from the formation slowness curves generated at each depth whose magnitude is a function of the extracted phase slowness coherence and depth. In an exemplary embodiment, the method further includes determining an estimate of the formation slowness at the plurality of depths within the borehole and generating a formation slowness estimate curve whose magnitude is a function of depth. In an exemplary embodiment, converting the extracted phase slowness coherence into a curve whose magnitude is a function of the extracted phase slowness coherence comprises converting the extracted phase slowness coherence into a dispersion curve; and generating a histogram of the dispersion curve. In an exemplary embodiment, the method further comprises generating a modified histogram from the histogram by setting the n highest valued histogram values equal to one and all remaining histogram values equal to zero. In an exemplary embodiment, the method further comprises generating a histogram mapping using the histograms generated at each depth. In an exemplary embodiment, the method further comprises interpolating between values of the histogram mapping to calculate intermediate histogram values. In an exemplary embodiment, extracting the phase slowness coherence of the recorded waveforms within the range of frequencies and phase slownesses comprises generating a frequency domain semblance of the recorded waveforms. In an exemplary embodiment, converting the extracted phase slowness coherence into the formation slowness curve whose magnitude is a function of the extracted phase slowness coherence comprises calculating the magnitude of the formation slowness curve as a function of a summation across frequencies of an n$^{th}$ power of the extracted phase slowness coherence. In an exemplary embodiment, converting the extracted phase slowness coherence into the formation slowness curve whose magnitude is a function of the extracted phase slowness coherence comprises calculating the magnitude of the formation slowness curve as a function of a summation across frequencies of n$^{th}$ order derivatives of the extracted phase slowness coherence. In an exemplary embodiment, converting the extracted phase slowness coherence into the formation slowness curve whose magnitude is a function of the extracted phase slowness coherence comprises calculating the magnitude of the formation slowness curve as a function of an n$^{th}$ order derivative of a summation across frequencies of the extracted phase slowness coherence. In an exemplary embodiment, converting the extracted phase slowness coherence into the formation slowness curve whose magnitude is a function of the extracted phase slowness coherence comprises calculating the magnitude of the formation slowness curve as a function of a probability distribution of the extracted phase slowness coherence. In an exemplary embodiment, converting the extracted phase slowness coherence into the formation slowness curve whose magnitude is a function of the extracted phase slowness coherence comprises calculating the magnitude of the formation slowness curve as a function of a summation across frequencies of an $n^{th}$ power of a coherence semblance map. In an exemplary embodiment, converting the extracted phase slowness coherence into the formation slowness curve whose magnitude is a function of the extracted phase slowness coherence comprises calculating the magnitude of the formation slowness curve as a function of an $n^{th}$ order derivative of a summation across frequencies of a coherence semblance map. In an exemplary embodiment, converting the extracted phase slowness coherence into the formation slowness curve whose magnitude is a function of the extracted phase slowness coherence comprises calculating the magnitude of the formation slowness curve as a function of a histogram of the extracted phase slowness coherence. In an exemplary embodiment, the formation slowness comprises formation compressional slowness. In an exemplary embodiment, the formation slowness comprises formation shear slowness. In an exemplary embodiment, the operational mode of the logging tool comprises a wireline dipole mode; and wherein converting the extracted phase slowness coherence into the formation slowness curve whose magnitude is a function of the extracted phase slowness coherence comprises calculating the magnitude of the formation slowness curve as a function of a summation across frequencies of the $n^{th}$ power of the extracted phase slowness coherence. In an exemplary embodiment, the operational mode of the logging tool comprises a logging while drilling quadrupole mode; and wherein converting the extracted phase slowness coherence into the formation slowness curve whose magnitude is a function of the extracted phase slowness coherence comprises calculating the magnitude of the formation slowness curve as a function of a summation across frequencies of the $n^{th}$ power of the extracted phase slowness coherence. In an exemplary embodiment, the operational mode of the logging tool comprises a wireline leaky P mode; and wherein converting the extracted phase slowness coherence into the formation slowness curve whose magnitude is a function of the extracted phase slowness coherence comprises calculating the magnitude of the formation slowness curve as a function of a summation across frequencies of the $n^{th}$ power of the extracted phase slowness coherence. In an exemplary embodiment, the operational mode of the logging tool comprises a wireline dipole mode having significant energy around a cutoff frequency; and wherein converting the extracted phase slowness coherence into the curve whose magnitude is a function of the extracted phase slowness coherence comprises calculating the magnitude of the curve as a function of a histogram of the extracted phase slowness coherence. In an exemplary embodiment, the operational mode of the logging tool comprises a wireline dipole mode having significant energy around a cutoff frequency; and wherein converting the extracted phase slowness coherence into the formation slowness curve whose magnitude is a function of the extracted phase slowness coherence comprises calculating the magnitude of the formation slowness curve as a function of a probability density of the extracted phase slowness coherence. In an exemplary embodiment, the operational mode of the logging tool comprises a leaky P mode having significant energy around a cutoff frequency; and wherein converting the extracted phase slowness coherence into the formation slowness curve whose magnitude is a function of the extracted phase slowness coherence comprises calculating the magnitude of the formation slowness curve as a function of a histogram of the extracted phase slowness coherence. In an exemplary embodiment, the operational mode of the logging tool comprises a leaky P mode having significant energy around a cutoff frequency; and wherein converting the extracted phase slowness coherence into the formation slowness curve whose magnitude is a function of the extracted phase slowness coherence comprises calculating the magnitude of the formation slowness curve as a function of a probability density of the extracted phase slowness coherence. In an exemplary embodiment, the operational mode of the logging tool comprises a monopole logging while drilling mode; wherein an energy of a formation compressional wave arrival can surpass a drilling collar wave arrival in a frequency stop band; wherein a slowness of the formation compressional wave arrival differs from the drilling collar wave arrival such that a summation of the $n^{th}$ power of the extracted phase slowness coherence comprises a plurality of local maxima, with at least one of the local maxima corresponding to the formation compressional wave arrival; and wherein converting the extracted phase slowness coherence into the formation slowness curve whose magnitude is a function of the extracted phase slowness coherence comprises calculating the magnitude of the formation slowness curve as a function of the summation of the $n^{th}$ power of the extracted phase slowness coherence. In an exemplary embodiment, the operational mode of the logging tool comprises a monopole logging while drilling mode; wherein an energy of a formation compressional wave arrival can surpass a drilling collar wave arrival in a frequency stop band; wherein a slowness of the formation compressional wave arrival differs from the drilling collar wave arrival such that a summation of the $n^{th}$ power of the extracted phase slowness coherence comprises a plurality of local maxima, with at least one of the local maxima corresponding to the formation compressional wave arrival; and wherein converting the extracted phase slowness coherence into the formation slowness curve whose magnitude is a function of the extracted phase slowness coherence comprises calculating the magnitude of the formation slowness curve as a function of the summation of a probability distribution of the extracted phase slowness coherence. In an exemplary embodiment, the operational mode of the logging tool comprises a monopole logging while drilling mode; wherein an energy of a formation compressional wave arrival can surpass a drilling collar wave arrival in a frequency stop band; wherein a slowness of the formation compressional wave arrival differs from the drilling collar wave arrival such that a summation of the $n^{th}$ power of the extracted phase slowness coherence comprises a plurality of local maxima, with at least one of the local maxima corresponding to the formation compressional wave arrival; and wherein converting the extracted phase slowness coherence into the formation slowness curve whose magnitude is a function of the extracted phase slowness coherence comprises calculating the magnitude of the formation slowness curve as a function of the summation of a histogram of the extracted phase slowness histogram. In an exemplary embodiment, at least one of the anomalies comprises a local maximum of the quantity. In an exemplary embodiment, the operational mode of the logging tool comprises a monopole logging while drilling mode; wherein an energy of a formation compressional wave arrival can surpass a drilling collar wave arrival in a frequency stop band; wherein a slowness of the formation compressional wave does not differ significantly from the drilling collar wave arrival; and wherein converting the extracted phase slowness coherence into the formation slowness curve whose magnitude is a function of the extracted phase slowness comprises calculating the magnitude of the formation slowness curve as a function of the summation of a 1st order derivative of the extracted phase slowness coherence. In an exemplary embodiment, at least one of the anomalies comprises a local maximum of the quantity. In an exemplary embodiment, at least one of the anomalies comprises a local minimum of the quantity. In an exemplary embodiment, the estimated formation slowness is determined solely as a function of data contained within the recorded waveforms. In an exemplary embodiment, the estimated formation slowness is determined in the presence of mode dispersion effects. In an exemplary embodiment, the properties of the formation are not homogeneous. In an exemplary embodiment, the properties of the formation are anisotropic.

A method for determining a quality of a determination of an estimate of a formation slowness using waveforms recorded by an acoustic logging tool positioned within a wellbore that traverses a subterranean formation has been described that includes extracting a phase slowness coherence of the recorded waveforms at a plurality of frequencies within a range of frequencies and phase slownesses; converting the extracted phase slowness coherence into a formation slowness curve whose magnitude is a function of the extracted phase slowness coherence; determining one or more anomalies within the formation slowness curve, wherein the location of one of the anomalies of the formation slowness curve is representative of the estimated formation slowness; positioning the logging tool at a plurality of depths within the borehole; repeating extracting, converting, and determining at each depth; generating a mapping of the formation slowness curve over a range of the depths; and generating values for the estimated formation slowness at the range of depths and constructing a formation estimate curve; wherein the quality of the estimated formation slownesses determined is a function of a degree to which the formation estimate curve overlays an edge of the mapping of the formation slowness curve. In an exemplary embodiment, converting the extracted phase slowness coherence into a formation slowness curve whose magnitude is a function of the extracted phase slowness coherence comprises converting the extracted phase slowness coherence into a dispersion curve; and generating a probability density function of the dispersion curve.

A system for estimating formation slowness using waveforms recorded by an acoustic logging tool positioned within a borehole that traverses the formation has been described that includes means for extracting a phase slowness coherence of the recorded waveforms at a plurality of frequencies within a range of frequencies and phase slownesses; means for converting the extracted phase slowness coherence into a formation slowness curve whose magnitude is a function of the extracted phase slowness coherence; and means for determining one or more anomalies within the formation slowness curve; wherein the location of one of the anomalies of the formation slowness curve is representative of the estimated formation slowness. In an exemplary embodiment, the anomalies comprise local maxima of the formation slowness curve. In an exemplary embodiment, the anomalies comprise local minima of the formation slowness curve. In an exemplary embodiment, means for extracting a phase slowness coherence of the recorded waveforms at a plurality of frequencies within a range of frequencies and phase slownesses comprises means for generating a phase slowness coherence semblance map. In an exemplary embodiment, means for converting the extracted phase slowness coherence into a formation slowness curve whose magnitude is a function of the extracted phase slowness coherence comprises means for generating a summation of the phase slowness coherence for a range of frequencies and slownesses. In an exemplary embodiment, means for determining one or more anomalies within the formation slowness curve comprises means for determining an $n^{th}$ order derivative of the formation slowness curve. In an exemplary embodiment, means for converting the extracted phase slowness coherence into a formation slowness curve whose magnitude is a function of the extracted phase slowness coherence comprises means for converting the extracted phase slowness coherence into a dispersion curve; and means for generating a histogram of the dispersion curve. In an exemplary embodiment, the anomalies comprise local maxima of the histogram. In an exemplary embodiment, means for converting the extracted phase slowness coherence into a formation slowness curve whose magnitude is a function of the extracted phase slowness coherence comprises means for converting the extracted phase slowness coherence into a dispersion curve; and means for generating a probability density function of the dispersion curve. In an exemplary embodiment, the anomalies comprise local maxima of the probability density function. In an exemplary embodiment, the system further comprises means for positioning the logging tools within a wellbore that traverses a subterranean formation; and means for repeating the steps of extracting, converting and determining at a plurality of depths within the wellbore. In an exemplary embodiment, the system further comprises means for generating a formation slowness mapping from the formation slowness curves generated at each depth whose magnitude is a function of the extracted phase slowness coherence and depth. In an exemplary embodiment, the system further comprises means for determining an estimate of the formation slowness at the plurality of depths within the borehole and generating a formation slowness estimate curve whose magnitude is a function of depth. In an exemplary embodiment, means for converting the extracted phase slowness coherence into a curve whose magnitude is a function of the extracted phase slowness coherence comprises means for converting the extracted phase slowness coherence into a dispersion curve; and means for generating a histogram of the dispersion curve. In an exemplary embodiment, the system further comprises means for generating a modified histogram from the histogram by setting the n highest valued histogram values equal to one and all remaining histogram values equal to zero. In an exemplary embodiment, the system further comprises means for generating a histogram mapping using the histograms generated at each depth. In an exemplary embodiment, the system further comprises means for interpolating between values of the histogram mapping to calculate intermediate histogram values. In an exemplary embodiment, the means for extracting the phase slowness coherence of the recorded waveforms within the range of frequencies and phase slownesses comprises means for generating a frequency domain semblance of the recorded waveforms. In an exemplary embodiment, the means for converting the extracted phase slowness coherence into the formation slowness curve whose magnitude is a function of the extracted phase slowness coherence comprises means for calculating the magnitude of the formation slowness curve as a function of a summation across frequencies of an $n^{th}$ power of the extracted phase slowness coherence. In an exemplary embodiment, means for converting the extracted phase slowness coherence into the formation slowness curve whose magnitude is a function of the extracted phase slowness coherence comprises means for calculating the magnitude of the formation slowness curve as a function of a summation across frequencies of $n^{th}$ order derivatives of the extracted phase slowness coherence. In an exemplary embodiment, means for converting the extracted phase slowness coherence into the formation slowness curve whose magnitude is a function of the extracted phase slowness coherence comprises means for calculating the magnitude of the formation slowness curve as a function of an $n^{th}$ order derivative of a summation across frequencies of the extracted phase slowness coherence. In an exemplary embodiment, means for converting the extracted phase slowness coherence into the formation slowness curve whose magnitude is a function of the extracted phase slowness coherence comprises means for calculating the magnitude of the formation slowness curve as a function of a probability distribution of the extracted phase slowness coherence. In an exemplary embodiment, means for converting the extracted phase slowness coherence into the formation slowness curve whose magnitude is a function of the extracted phase slowness coherence comprises means for calculating the magnitude of the formation slowness curve as a function of a summation across frequencies of an $n^{th}$ power of a coherence semblance map. In an exemplary embodiment, means for converting the extracted phase slowness coherence into the formation slowness curve whose magnitude is a function of the extracted phase slowness coherence comprises means for calculating the magnitude of the formation slowness curve as a function of an $n^{th}$ order derivative of a summation across frequencies of a coherence semblance map. In an exemplary embodiment, means for converting the extracted phase slowness coherence into the formation slowness curve whose magnitude is a function of the extracted phase slowness coherence comprises means for calculating the magnitude of the formation slowness curve as a function of a histogram of the extracted phase slowness coherence. In an exemplary embodiment, the formation slowness comprises formation compressional slowness. In an exemplary embodiment, the formation slowness comprises formation shear slowness. In an exemplary embodiment, the operational mode of the logging tool comprises a wireline dipole mode; and wherein means for converting the extracted phase slowness coherence into the formation slowness curve whose magnitude is a function of the extracted phase slowness coherence comprises means for calculating the magnitude of the formation slowness curve as a function of a summation across frequencies of the $n^{th}$ power of the extracted phase slowness coherence. In an exemplary embodiment, the operational mode of the logging tool comprises a logging while drilling quadrupole mode; and wherein means for converting the extracted phase slowness coherence into the formation slowness curve whose magnitude is a function of the extracted phase slowness coherence comprises means for calculating the magnitude of the formation slowness curve as a function of a summation across frequencies of the $n^{th}$ power of the extracted phase slowness coherence. In an exemplary embodiment, the operational mode of the logging tool comprises a wireline leaky P mode; and wherein means for converting the extracted phase slowness coherence into the formation slowness curve whose magnitude is a function of the extracted phase slowness coherence comprises means for calculating the magnitude of the formation slowness curve as a function of a summation across frequencies of the $n^{th}$ power of the extracted phase slowness coherence. In an exemplary embodiment, the operational mode of the logging tool comprises a wireline dipole mode having significant energy around a cutoff frequency; and wherein means for converting the extracted phase slowness coherence into the curve whose magnitude is a function of the extracted phase slowness coherence comprises means for calculating the magnitude of the curve as a function of a histogram of the extracted phase slowness. In an exemplary embodiment, the operational mode of the logging tool comprises a wireline dipole mode having significant energy around a cutoff frequency; and wherein means for converting the extracted phase slowness coherence into the formation slowness curve whose magnitude is a function of the extracted phase slowness coherence comprises means for calculating the magnitude of the formation slowness curve as a function of a probability density of the extracted phase slowness coherence. In an exemplary embodiment, the operational mode of the logging tool comprises a leaky P mode having significant energy around a cutoff frequency; and wherein means for converting the extracted phase slowness coherence into the formation slowness curve whose magnitude is a function of the extracted phase slowness coherence comprises means for calculating the magnitude of the formation slowness curve as a function of a histogram of the extracted phase slowness coherence. In an exemplary embodiment, the operational mode of the logging tool comprises a leaky P mode having significant energy around a cutoff frequency; and wherein means for converting the extracted phase slowness coherence into the formation slowness curve whose magnitude is a function of the extracted phase slowness coherence comprises means for calculating the magnitude of the formation slowness curve as a function of a probability density of the extracted phase slowness coherence. In an exemplary embodiment, the operational mode of the logging tool comprises a monopole logging while drilling mode; wherein an energy of a formation compressional wave arrival can surpass a drilling collar wave arrival in a frequency stop band; wherein a slowness of the formation compressional wave arrival differs from the drilling collar wave arrival such that a summation of the $n^{th}$ power of the extracted phase slowness coherence comprises a plurality of local maxima, with at least one of the local maxima corresponding to the formation compressional wave arrival; and wherein means for converting the extracted phase slowness coherence into the formation slowness curve whose magnitude is a function of the extracted phase slowness coherence comprises means for calculating the magnitude of the formation slowness curve as a function of the summation of the $n^{th}$ power of the extracted phase slowness coherence. In an exemplary embodiment, the operational mode of the logging tool comprises a monopole logging while drilling mode; wherein an energy of a formation compressional wave arrival can surpass a drilling collar wave arrival in a frequency stop band; wherein a slowness of the formation compressional wave arrival differs from the drilling collar wave arrival such that a summation of the $n^{th}$ power of the extracted phase slowness coherence comprises a plurality of local maxima, with at least one of the local maxima corresponding to the formation compressional wave arrival; and wherein means for converting the extracted phase slowness coherence into the formation slowness curve whose magnitude is a function of the extracted phase slowness coherence comprises means for calculating the magnitude of the formation slowness curve as a function of the summation of a probability distribution of the extracted phase slowness coherence. In an exemplary embodiment, the operational mode of the logging tool comprises a monopole logging while drilling mode; wherein an energy of a formation compressional wave arrival can surpass a drilling collar wave arrival in a frequency stop band; wherein a slowness of the formation compressional wave arrival differs from the drilling collar wave arrival such that a summation of the $n^{th}$ power of the extracted phase slowness coherence comprises a plurality of local maxima, with at least one of the local maxima corresponding to the formation compressional wave arrival; and wherein means for converting the extracted phase slowness coherence into the formation slowness curve whose magnitude is a function of the extracted phase slowness coherence comprises means for calculating the magnitude of the formation slowness curve as a function of the summation of a histogram of the extracted phase slowness histogram. In an exemplary embodiment, at least one of the anomalies comprises a local maximum of the quantity. In an exemplary embodiment, the operational mode of the logging tool comprises a monopole logging while drilling mode; wherein an energy of a formation compressional wave arrival can surpass a drilling collar wave arrival in a frequency stop band; wherein a slowness of the formation compressional wave does not differ significantly from the drilling collar wave arrival; and wherein means for converting the extracted phase slowness coherence into the formation slowness curve whose magnitude is a function of the extracted phase slowness comprises means for calculating the magnitude of the formation slowness curve as a function of the summation of a 1st order derivative of the extracted phase slowness coherence. In an exemplary embodiment, at least one of the anomalies comprises a local maximum of the quantity. In an exemplary embodiment, at least one of the anomalies comprises a local minimum of the quantity. In an exemplary embodiment, the estimated formation slowness is determined solely as a function of data contained within the recorded waveforms. In an exemplary embodiment, the estimated formation slowness is determined in the presence of mode dispersion effects. In an exemplary embodiment, the properties of the formation are not homogeneous. In an exemplary embodiment, the properties of the formation are anisotropic.

A system for determining a quality of a determination of an estimate of a formation slowness using waveforms recorded by an acoustic logging tool positioned within a wellbore that traverses a subterranean formation has been described that includes means for extracting a phase slowness coherence of the recorded waveforms at a plurality of frequencies within a range of frequencies and phase slownesses; means for converting the extracted phase slowness coherence into a formation slowness curve whose magnitude is a function of the extracted phase slowness coherence; means for determining one or more anomalies within the formation slowness curve, wherein the location of one of the anomalies of the formation slowness curve is representative of the estimated formation slowness; positioning the logging tool at a plurality of depths within the borehole; repeating extracting, converting, and determining at each depth; generating a mapping of the formation slowness curve over a range of the depths; and means for generating values for the estimated formation slowness at the range of depths and constructing a formation estimate curve; wherein the quality of the estimated formation slownesses determined is a function of a degree to which the formation estimate curve overlays an edge of the mapping of the formation slowness curve. In a exemplary embodiment, means for converting the extracted phase slowness coherence into a formation slowness curve whose magnitude is a function of the extracted phase slowness coherence comprises means for converting the extracted phase slowness coherence into a dispersion curve; and generating a probability density function of the dispersion curve.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A method for estimating formation slowness using waveforms recorded by an acoustic logging tool positioned at a first depth within a borehole that traverses a subterranean formation, comprising:
    selecting at least one digital computer and programming it to perform the following steps:
    extracting a phase slowness coherence of the recorded waveforms at a plurality of frequencies within a range of frequencies and phase slownesses;
    converting the extracted phase slowness coherence into a formation slowness curve whose magnitude is a function of the extracted phase slowness coherence;
    determining one or more anomalies within the formation slowness curve,
    wherein the location of one of the anomalies of the formation slowness curve is representative of the estimated formation slowness; and
    outputting at least one value of estimated formation slowness;
    wherein the formation slowness comprises either formation compressional slowness or formation shear slowness.

2. The method of claim 1, wherein the anomalies comprise one or more anomalies from the group of anomalies consisting of local maxima and local minima of the formation slowness curve.

3. The method of claim 1, wherein extracting a phase slowness coherence of the recorded waveforms at a plurality of frequencies within a range of frequencies and phase slownesses comprises:
    generating a phase slowness coherence semblance map.

4. The method of claim 3, further comprising smoothing the phase slowness coherence semblance map.

5. The method of claim 3, further comprising zeroing out all semblance points on the semblance map having a semblance value lower than a threshold.

6. The method of claim 1, wherein converting the extracted phase slowness coherence into a formation slowness curve whose magnitude is a function of the extracted phase slowness coherence comprises:
    generating a summation across frequencies of the phase slowness coherence for a range of frequencies and slownesses.

7. The method of claim 6, wherein generating a summation across frequencies of the phase slowness coherencies comprises taking the $n^{th}$ power of the phase slowness coherence values.

8. The method of claim 1, wherein determining one or more anomalies within the formation slowness curve comprises:
    determining an $n^{th}$ order derivative of the formation slowness curve, where n is a real number greater than zero.

9. The method of claim 1, wherein converting the extracted phase slowness coherence into a formation slowness curve whose magnitude is a function of the extracted phase slowness coherence comprises:
    converting the extracted phase slowness coherence into a dispersion curve; and
    generating a histogram of the dispersion curve.

10. The method of claim 9, wherein the anomalies comprise local maxima of the histogram.

11. The method of claim 9, wherein converting the extracted phase slowness coherence into a dispersion curve comprises selecting, for each frequency in the plurality, a slowness, corresponding to that frequency, associated with the greatest magnitude of all the phase slowness coherence values corresponding to that frequency, and including the selected slowness as a point on the dispersion curve.

12. The method of claim 9, further comprising smoothing the extracted phase slowness coherence prior to converting the extracted phase slowness coherence into a dispersion curve.

13. The method of claim 9, wherein generating a histogram of the dispersion curve comprises accumulating the dispersion curve into a plurality of histogram bins corresponding to different slownesses.

14. The method of claim 13, wherein accumulating the dispersion curve into a plurality of histogram bins corresponding to different slownesses comprises, for each frequency point on the dispersion curve, incrementing the histogram bin corresponding to the slowness of the dispersion curve frequency point by the magnitude of the dispersion curve frequency point.

15. The method of claim 13, wherein accumulating the dispersion curve into a plurality of histogram bins corresponding to different slownesses comprises, for each frequency point on the dispersion curve, incrementing the histogram bin corresponding to the slowness of the dispersion curve frequency point by one.

16. The method of claim 13, wherein accumulating the dispersion curve into a plurality of histogram bins corresponding to different slownesses comprises, for each frequency point on the dispersion curve, incrementing the histogram bin corresponding to the slowness by a weighting factor.

17. The method of claim 16, wherein the weighting factor is selected based at least in part on the wave spectra of the recorded waveforms, the slowness-frequency coherence values corresponding to the dispersion curve, and combinations thereof.

18. The method of claim 1, wherein converting the extracted phase slowness coherence into a formation slowness curve whose magnitude is a function of the extracted phase slowness coherence comprises:
converting the extracted phase slowness coherence into a dispersion curve; and
generating a probability density function of the dispersion curve.

19. The method of claim 18, wherein the anomalies comprise local maxima of the probability density function.

20. The method of claim 1, further comprising repeating the extracting, the converting and the determining for waveforms recorded by the acoustic logging tool while positioned at a plurality of other depths within the borehole.

21. The method of claim 20, further comprising:
generating a formation slowness mapping from the formation slowness curves generated at each depth whose magnitude is a function of the extracted phase slowness coherence and depth.

22. The method of claim 20, further comprising:
determining an estimate of the formation slowness at the plurality of depths within the borehole and generating a formation slowness estimate curve whose magnitude is a function of depth.

23. The method of claim 20, wherein converting the extracted phase slowness coherence into a curve whose magnitude is a function of the extracted phase slowness coherence comprises:
converting the extracted phase slowness coherence into a dispersion curve; and
generating a histogram of the dispersion curve.

24. The method of claim 23, further comprising:
generating a modified histogram from the histogram by setting the n highest valued histogram values equal to one and all remaining histogram values equal to zero.

25. The method of claim 23, further comprising:
generating a histogram mapping using the histograms generated at each depth.

26. The method of claim 25, further comprising:
interpolating between values of the histogram mapping to calculate intermediate histogram values.

27. The method of claim 20, further comprising:
generating a vector of formation slowness candidate values comprising possible values for formation slowness for each depth; and
generating a vector of formation slowness values comprising determined values for formation slowness at each depth as a function of the vector of formation slowness candidate values.

28. The method of claim 27, wherein generating a vector of formation slowness candidate values comprising possible values for formation slowness for each depth comprises:
generating a phase slowness coherence map at each depth;
generating a formation slowness curve from a summation of the phase slowness coherence map for a range of frequencies and slownesses at each depth; and
determining a candidate value for formation slowness at each depth by determining a local maximum or minimum of an $n^{th}$ order derivative of the formation slowness curve.

29. The method of claim 27, wherein generating a vector of formation slowness values comprising determined values for formation slowness at each depth as a function of the vector of formation slowness candidate values comprises:
generating a phase slowness coherence map at each depth;
generating a dispersion curve from the phase slowness dispersion map at each depth;
and generating a histogram of the dispersion curve at each depth.

30. The method of claim 29, wherein generating a vector of formation slowness values comprising determined values for formation slowness at each depth as a function of the vector of formation slowness candidate values comprises:
selecting the N highest valued histogram values at each depth and set them equal to one; and
setting the value of the remaining histogram values at each depth equal to zero.

31. The method of claim 30, wherein generating a vector of formation slowness values comprising determined values for formation slowness at each depth as a function of the vector of formation slowness candidate values comprises:
generating a histogram mapping for a range of depths and slownesses comprising the non-zero valued histogram values.

32. The method of claim 31, wherein generating a vector of formation slowness values comprising determined values for formation slowness at each depth as a function of the vector of formation slowness candidate values comprises:
if the value for the histogram mapping at a selected depth is not equal to zero, then setting the value of the vector of formation slowness values equal to the formation slowness value for the vector of formation slowness candidate values for the selected depth; and
if the value for the histogram mapping at a selected depth is equal to zero, then setting the value of the vector of formation slowness values equal to a null value.

33. The method of claim 32, wherein generating a vector of formation slowness values comprising determined values for formation slowness at each depth as a function of the vector of formation slowness candidate values comprises:

if the value for the vector of formation slowness values at a selected depth is equal to a null value, then setting the value of the vector of formation slowness values at the selected depth equal to an average of adjacent non-null valued formation slowness values of the vector of formation slowness values.

34. The method of claim 1, wherein extracting the phase slowness coherence of the recorded waveforms within the range of frequencies and phase slownesses comprises:

generating a frequency domain semblance of the recorded waveforms.

35. The method of claim 1, wherein converting the extracted phase slowness coherence into the formation slowness curve whose magnitude is a function of the extracted phase slowness coherence comprises:

calculating the magnitude of the formation slowness curve as a function of a summation across frequencies of an $n^{th}$ power of the extracted phase slowness coherence.

36. The method of claim 1, wherein converting the extracted phase slowness coherence into the formation slowness curve whose magnitude is a function of the extracted phase slowness coherence comprises:

calculating the magnitude of the formation slowness curve as a function of a summation across frequencies of nth order derivatives of the extracted phase slowness coherence.

37. The method of claim 1, wherein converting the extracted phase slowness coherence into the formation slowness curve whose magnitude is a function of the extracted phase slowness coherence comprises:

calculating the magnitude of the formation slowness curve as a function of an $n^{th}$ order derivative of a summation across frequencies of the extracted phase slowness coherence.

38. The method of claim 1, wherein converting the extracted phase slowness coherence into the formation slowness curve whose magnitude is a function of the extracted phase slowness coherence comprises:

calculating the magnitude of the formation slowness curve as a function of a probability distribution of the extracted phase slowness coherence.

39. The method of claim 1, wherein converting the extracted phase slowness coherence into the formation slowness curve whose magnitude is a function of the extracted phase slowness coherence comprises:

calculating the magnitude of the formation slowness curve as a function of a summation across frequencies of an $n^{th}$ power of a coherence semblance map.

40. The method of claim 1, wherein converting the extracted phase slowness coherence into the formation slowness curve whose magnitude is a function of the extracted phase slowness coherence comprises:

calculating the magnitude of the formation slowness curve as a function of an $n^{th}$ order derivative of a summation across frequencies of a coherence semblance map.

41. The method of claim 1, wherein converting the extracted phase slowness coherence into the formation slowness curve whose magnitude is a function of the extracted phase slowness coherence comprises:

calculating the magnitude of the formation slowness curve as a function of a histogram of the extracted phase slowness coherence.

42. The method of claim 1, wherein the formation slowness comprises formation compressional slowness.

43. The method of claim 1, wherein the formation slowness comprises formation shear slowness.

44. The method of claim 1, wherein the operational mode of the logging tool comprises a mode selected from the group of modes consisting of a wireline dipole mode, a logging while drilling quadrupole mode, and a wireline leaky P mode; and wherein converting the extracted phase slowness coherence into the formation slowness curve whose magnitude is a function of the extracted phase slowness coherence comprises:

calculating the magnitude of the formation slowness curve as a function of a summation across frequencies of the $n^{th}$ power of the extracted phase slowness coherence.

45. The method of claim 1, wherein the operational mode of the logging tool comprises a mode selected from the group of modes consisting of a wireline dipole mode having significant energy around a cutoff frequency and a leaky P mode having significant energy around a cutoff frequency; and wherein converting the extracted phase slowness coherence into the curve whose magnitude is a function of the extracted phase slowness coherence comprises:

calculating the magnitude of the curve as a function of a histogram of the extracted phase slowness.

46. The method of claim 1, wherein the operational mode of the logging tool comprises a mode selected from the group of modes consisting of a wireline dipole mode having significant energy around a cutoff frequency and a leaky P mode having significant energy around a cutoff frequency; and wherein converting the extracted phase slowness coherence into the formation slowness curve whose magnitude is a function of the extracted phase slowness coherence comprises:

calculating the magnitude of the formation slowness curve as a function of a probability density of the extracted phase slowness coherence.

47. The method of claim 1, wherein the operational mode of the logging tool comprises a monopole logging while drilling mode; wherein an energy of a formation compressional wave arrival can surpass a drilling collar wave arrival in a frequency stop band; wherein a slowness of the formation compressional wave arrival differs from the drilling collar wave arrival such that a summation of the $n^{th}$ power of the extracted phase slowness coherence comprises a plurality of local maxima, with at least one of the local maxima corresponding to the formation compressional wave arrival; and wherein converting the extracted phase slowness coherence into the formation slowness curve whose magnitude is a function of the extracted phase slowness coherence comprises a method selected from the group of methods consisting of calculating the magnitude of the formation slowness curve as a function of the summation of the $n^{th}$ power of the extracted phase slowness coherence, calculating the magnitude of the formation slowness curve as a function of the summation of a probability distribution of the extracted phase slowness coherence, and calculating the magnitude of the formation slowness curve as a function of the summation of a histogram of the extracted phase slowness histogram.

48. The method of claim 47, wherein at least one of the anomalies comprises a local maximum of the quantity.

49. The method of claim 1, wherein the operational mode of the logging tool comprises a monopole logging while drilling mode; wherein an energy of a formation compressional wave arrival can surpass a drilling collar wave arrival in a frequency stop band; wherein a slowness of the formation compressional wave arrival does not differ significantly from the drilling collar wave arrival; and wherein converting the extracted phase slowness coherence into the formation slowness curve whose magnitude is a function of the extracted phase slowness comprises:

calculating the magnitude of the formation slowness curve as a function of the summation of a $1^{st}$ order derivative of the extracted phase slowness coherence.

50. A method for determining quality of a determination of an estimate of a formation slowness using waveforms recorded by an acoustic logging tool positioned at a plurality of depths within a borehole that traverses a subterranean formation, comprising:

selecting at least one digital computer and programming it to perform the following steps:

for each depth, extracting a phase slowness coherence of the recorded waveforms at a plurality of frequencies within a range of frequencies and phase slownesses, converting the extracted phase slowness coherence into a formation slowness curve whose magnitude is a function of the extracted phase slowness coherence, wherein said converting the extracted phase slowness coherence comprises converting the extracted phase slowness coherence into a dispersion curve, and generating a probability density function of the dispersion curve, and determining one or more anomalies within the formation slowness curve, wherein the location of one of the anomalies of the formation slowness curve is representative of the estimated formation slowness;

generating a mapping of the formation slowness curve over a range of the depths; and generating values for the estimated formation slowness at the range of depths and constructing a formation estimate curve;

wherein the quality of the estimated formation slownesses determined is a function of a degree to which the formation estimate curve overlays an edge of the mapping of the formation slowness curve; and outputting at least one value of estimated formation slowness.

51. A method for estimating formation slowness using waveforms recorded by an acoustic logging tool positioned at a first depth within a borehole that traverses a subterranean formation, comprising:

selecting at least one digital computer and programming it to perform the following steps:

(a) extracting a phase slowness coherence of the recorded waveforms at a plurality of frequencies within a range of frequencies and phase slownesses;

(b) converting the extracted phase slowness coherence into a formation slowness curve whose magnitude is a function of the extracted phase slowness coherence;

(c) determining one or more anomalies within the formation slowness curve, wherein the location of one of the anomalies of the formation slowness curve is representative of the estimated formation slowness;

(d) repeating steps (a)-(c) for waveforms recorded by the acoustic logging tool while positioned at a plurality of other depths within the borehole; and (d) outputting at least one value of estimated formation slowness.

* * * * *